United States Patent
Minerbo et al.

(10) Patent No.: US 7,138,897 B2
(45) Date of Patent: Nov. 21, 2006

(54) INDUCTION MEASUREMENTS WITH REDUCED BOREHOLE EFFECTS

(75) Inventors: Gerald Minerbo, Missouri City, TX (US); Sofia Davydycheva, Sugar Land, TX (US); Hanming Wang, Sugar Land, TX (US); Dean M. Homan, Sugar Land, TX (US)

(73) Assignee: Schlumberger Technology Corporation, Sugar Land, TX (US)

(*) Notice: Subject to any disclaimer, the term of this patent is extended or adjusted under 35 U.S.C. 154(b) by 230 days.

(21) Appl. No.: 10/711,309

(22) Filed: Sep. 9, 2004

(65) Prior Publication Data

US 2005/0083161 A1  Apr. 21, 2005

Related U.S. Application Data

(60) Provisional application No. 60/511,467, filed on Oct. 15, 2003.

(51) Int. Cl.
 *H01F 27/02* (2006.01)
(52) U.S. Cl. .......................................... 336/90; 324/339
(58) Field of Classification Search ................ 336/65, 336/84 R, 84 C, 90–96; 324/239, 323, 338–339
 See application file for complete search history.

(56) References Cited

U.S. PATENT DOCUMENTS

| | | | |
|---|---|---|---|
| 3,609,521 A | 9/1971 | Desbrandes | |
| 3,808,520 A | 4/1974 | Runge | |
| 4,302,722 A | 11/1981 | Gianzero | |
| 4,319,191 A | 3/1982 | Meador et al. | |
| 4,651,101 A * | 3/1987 | Barber et al. ................ | 324/339 |
| 4,808,929 A * | 2/1989 | Oldigs ......................... | 324/339 |
| 4,873,488 A | 10/1989 | Barber et al. | |
| 5,041,975 A | 8/1991 | Minerbo et al. | |
| 5,058,077 A | 10/1991 | Twist | |
| 5,235,285 A | 8/1993 | Clark et al. | |
| 5,343,001 A * | 8/1994 | Cowles et al. .............. | 181/102 |
| 5,508,616 A | 4/1996 | Sato et al. | |
| 5,757,191 A | 5/1998 | Gianzero | |
| 5,781,436 A | 7/1998 | Forgang et al. | |
| 6,044,325 A | 3/2000 | Chakravarthy et al. | |
| 6,147,496 A | 11/2000 | Strack et al. | |
| 6,297,639 B1 | 10/2001 | Clark et al. | |
| 6,304,086 B1 | 10/2001 | Minerbo et al. | |

(Continued)

OTHER PUBLICATIONS

Moran, J.H. et al., Basic Theory of Induction Logging and Application to Study of Two-Coil Sondes, Geophysics vol. 27, No. 6, Dec. 1962, pp. 829-858.

(Continued)

*Primary Examiner*—Tuyen T Nguyen
(74) *Attorney, Agent, or Firm*—Kevin P. McEroney; Bryan L. White; Victor H. Segura

(57) ABSTRACT

An induction tool includes a conductive mandrel; at least one array including a transmitter, a bucking coil, and a receiver disposed in an insulating tool body surrounding the conductive mandrel; and an electrode disposed on the insulating tool body at a selected location between the bucking coil and the receiver, wherein the selected location is spaced from the transmitter at a distance corresponding approximately to the harmonic mean of the distance between the transmitter and the bucking coil and the distance between the transmitter and the receiver, and wherein the electrode includes a contact forming a conductive path to the conductive mandrel. Additional electrodes may be disposed above and below each transmitter and receiver coil to reduce sensitivity to eccentricity of the tool in the borehole.

18 Claims, 20 Drawing Sheets

U.S. PATENT DOCUMENTS

| | | |
|---|---|---|
| 6,351,127 B1 | 2/2002 | Rosthal et al. |
| 6,380,744 B1 | 4/2002 | Clark et al. |
| 6,509,738 B1 | 1/2003 | Minerbo et al. |
| 6,541,979 B1 | 4/2003 | Omeragic |
| 6,556,015 B1 | 4/2003 | Omeragic et al. |
| 6,557,794 B1 | 5/2003 | Rosthal et al. |
| 6,566,881 B1 | 5/2003 | Omeragic et al. |
| 6,573,722 B1 | 6/2003 | Rosthal et al. |
| 6,574,562 B1 | 6/2003 | Tabarovsky et al. |
| 6,584,408 B1 | 6/2003 | Omeragic |
| 6,586,939 B1 * | 7/2003 | Fanini et al. ............... 324/339 |
| 6,624,634 B1 | 9/2003 | Rosthal et al. |
| 6,630,830 B1 | 10/2003 | Omeragic et al. |
| 6,667,620 B1 | 12/2003 | Homan et al. |
| 6,680,613 B1 | 1/2004 | Rosthal et al. |
| 6,693,430 B1 | 2/2004 | Rosthal et al. |
| 6,710,601 B1 | 3/2004 | Rosthal et al. |
| 7,091,877 B1 * | 8/2006 | Barber et al. ............ 340/853.1 |
| 2002/0057210 A1 | 5/2002 | Frey et al. |
| 2002/0079899 A1 | 6/2002 | Frey et al. |
| 2003/0085707 A1 | 5/2003 | Minerbo et al. |
| 2003/0146753 A1 | 8/2003 | Rosthal et al. |
| 2003/0155924 A1 | 8/2003 | Rosthal et al. |
| 2003/0184303 A1 | 10/2003 | Homan et al. |
| 2003/0184488 A1 | 10/2003 | Smith et al. |
| 2003/0200029 A1 | 10/2003 | Omeragic et al. |
| 2003/0229450 A1 | 12/2003 | Strickland |

OTHER PUBLICATIONS

Moran, J.H. et al., Effects of Formation Anisotropy on Resistivity-Logging Measurements, Geophysics vol. 44, No. 7, Jul. 1979, pp. 1266-1286.

Hunka, J.F. et al., A New Resistivity Measurement System for Deep Formation Imaging and High-Resolution Formation Evaluation, SPE20559, Sep. 1990, pp. 295-307.

Doll, H.G. et al., Introduction to Induction Logging and Application to Logging of Wells Drilled with Oil Base Mud, Jun. 1949, pp. 148-162.

* cited by examiner

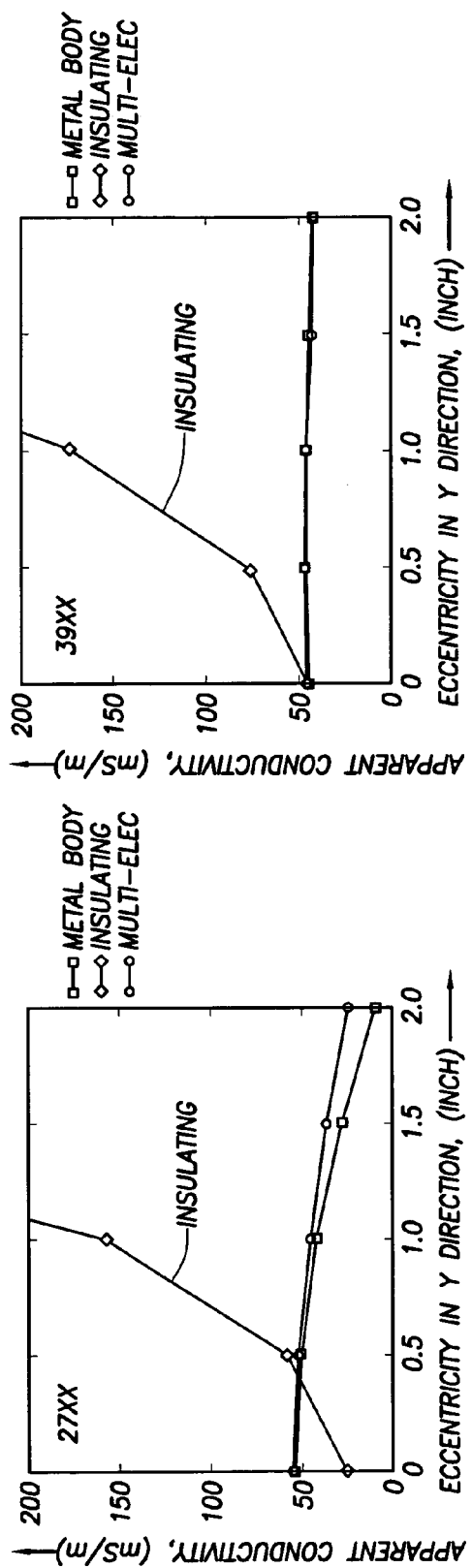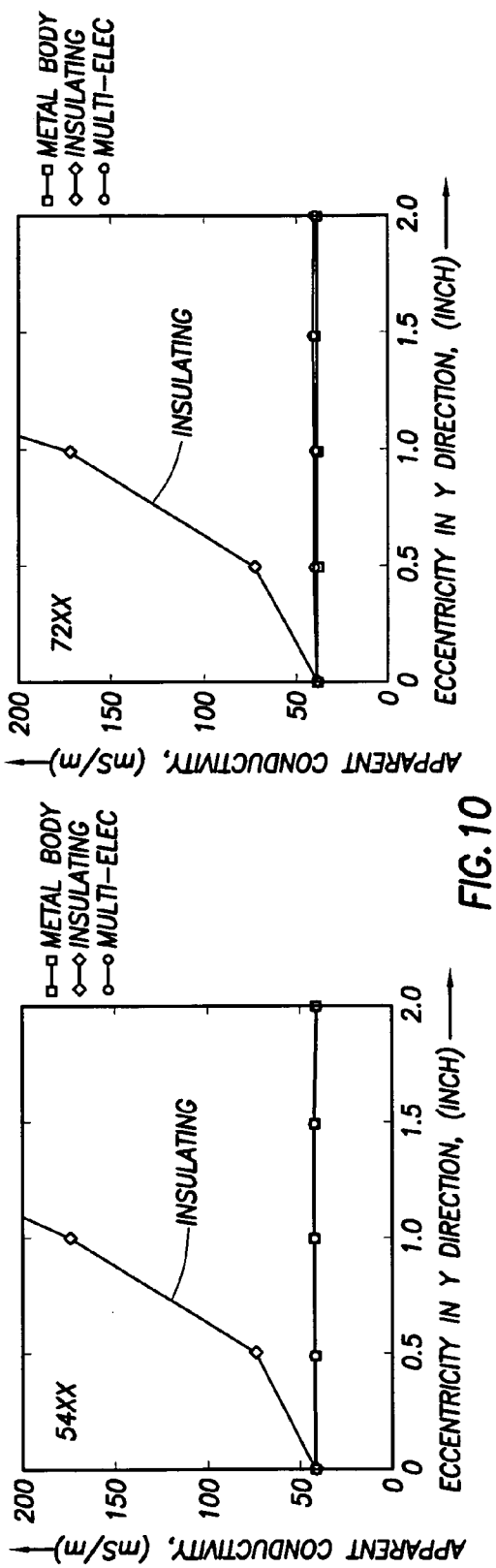
FIG. 10

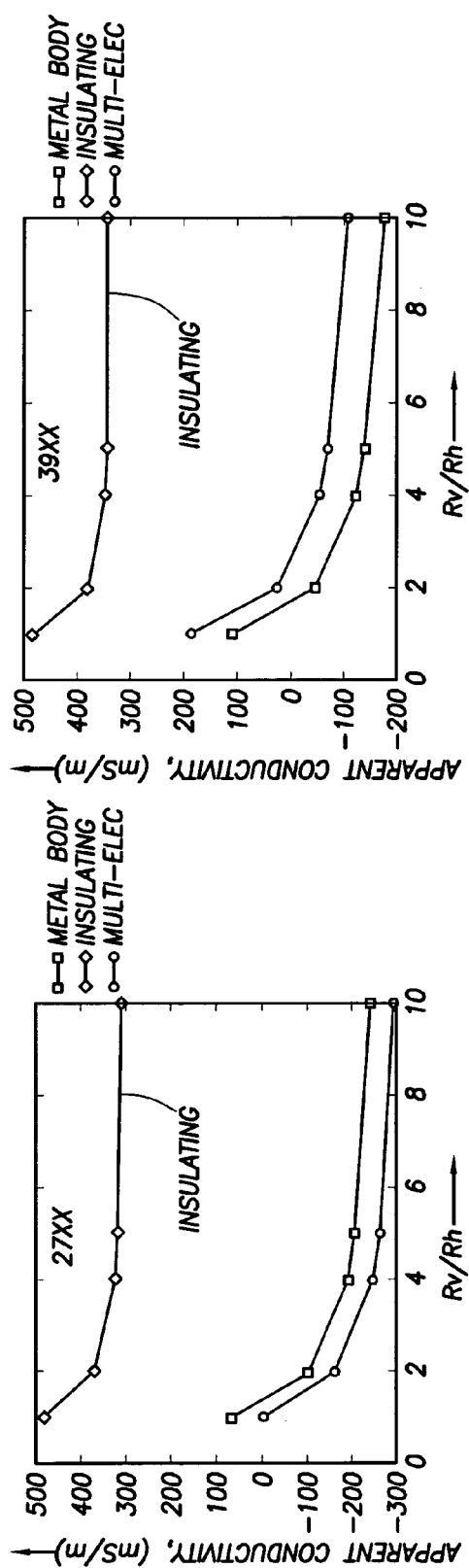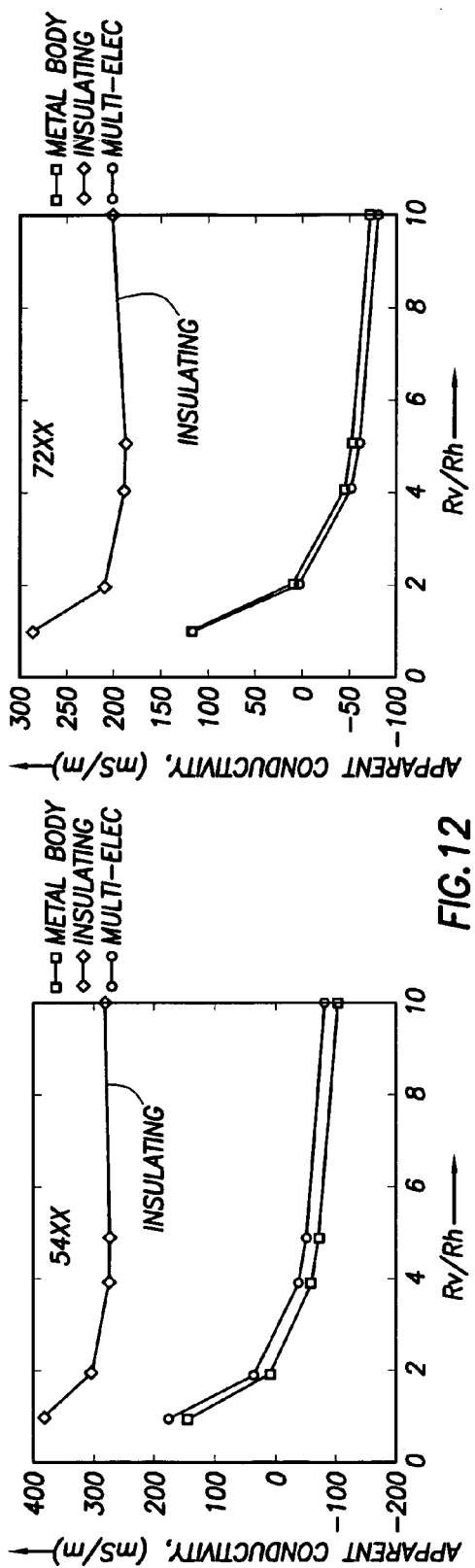
FIG. 12

INDUCTION MEASUREMENTS WITH REDUCED BOREHOLE EFFECTS

CROSS-REFERENCE TO RELATED APPLICATIONS

This claims benefit, under 35 U.S.C. § 119, of Provisional Application Ser. No. 60/511,467 filed Oct. 15, 2003. This Provisional Application is incorporated by reference in its entirety.

STATEMENT REGARDING FEDERALLY SPONSORED RESEARCH OR DEVELOPMENT

Not applicable.

BACKGROUND OF INVENTION

1. Field of the Invention

The invention relates generally to techniques for formation resistivity logging using induction tools. More particularly, the invention relates to induction tools and methods for reducing borehole effects in resistivity measurements.

2. Background Art

Electromagnetic (EM) induction tools are used in the oil and gas industry to determine the resistivity of earth formations surrounding a borehole. Induction tools work by using a transmitting coil (transmitter) to set up an alternating magnetic field in the earth formations. This alternating magnetic field induces eddy currents in the formations. One or more receiving coils (receivers), disposed at a distance from the transmitter, are used to detect the current flowing in the earth formation. The magnitudes of the received signals are approximately proportional to the formation conductivity. Therefore, formation conductivities may be derived from the received signals.

Conventional wireline and LWD EM induction tools are implemented with coils (antennas) that may function as sources and/or sensors. On wireline EM induction tools, the antennas are typically enclosed by a housing (or tool body) constructed of a tough plastic (insulating) material, e.g., a laminated fiberglass material impregnated with epoxy resin. On LWD EM induction tools, the antennas are generally mounted on metallic supports (collars) to withstand the hash environments encountered during drilling.

On both wireline and LWD induction tools, the antennas are typically spaced apart from each other along the axis of the tool. These antennas are generally coils of the solenoid type that comprise one or more turns of insulated conductor wire wound around a support. U.S. Pat. Nos. 4,873,488 and 5,235,285 (both assigned to the present assignee), for example, disclose instruments equipped with antennas disposed along a central metallic support (a conductive mandrel).

A coil (or antenna) carrying a current can be represented as a magnetic moment proportional to the current and the area. The direction and magnitude of the magnetic moment can be represented by a vector perpendicular to the plane of the coil. In conventional induction and propagation logging instruments, the transmitter and receiver antennas are mounted with their magnetic moments aligned with the longitudinal axis of the instruments. That is, these instruments have longitudinal magnetic dipoles (LMD). When an LMD tool is placed in a borehole and energized to transmit EM energy, the induced eddy currents flow in loops around the antenna in the borehole and in the surrounding formation. These eddy currents flow in planes that are perpendicular to the tool axis (hence, borehole axis). Therefore, no eddy current flows up or down the borehole when the tool is centralized in the borehole.

An emerging technique in the field of EM induction well logging is the use of instruments incorporating antennas having tilted or transverse antennas, i.e., the magnetic dipoles of the antennas are tilted or perpendicular to the tool axis. That is, these instruments have transverse or tilted magnetic dipoles (TMD). These TMD instruments can induce eddy currents that flow up and down the borehole and, thus, provide measurements that are sensitive to dipping planes, formation fractures, or formation anisotropy. Modern induction tools typically include triaxial arrays, in which the transmitter and receivers may each comprise three coils arranged in different orientations (typically in orthogonal directions). Two of the coils in a triaxial transmitter or receiver may be TMD antennas. Logging instruments equipped with TMDs are described, for example, in U.S. Pat. Nos. 4,319,191, 5,508,616, 5,757,191, 5,781,436, 6,044,325, and 6,147,496.

While the TMD tools (including triaxial tools) are capable of providing additional information about the formation resistivity, these tools are more strongly affected by the borehole, particularly in high contrast situations, i.e., when the mud in the borehole is more conductive than the formation. When a TMD tool is energized at the center of a borehole (shown as 20 in FIG. 1a), it can induce eddy currents flowing up and down the borehole. However, due to the symmetry, the up and down currents cancel out and there is no net current flowing up or down the borehole. When a TMD tool is eccentered, the symmetry may disappear. If the TMD tool is eccentered in a direction parallel to the direction of the magnetic dipole of its antenna (shown as 22 in FIG. 1a), the symmetry with respect to the antenna is maintained and there is still no net current flowing along the borehole axis, when the antenna is energized. However, if a TMD is eccentered in a direction perpendicular to the direction of the magnetic dipole of its antenna (shown as 21 in FIG. 1a), the symmetry no longer exists and there will be net currents flowing up or down the borehole, when the antenna is energized. In high contrast situations (i.e., conductive mud and resistive formation), the borehole currents can flow a long distance along the borehole. The current flow in the formation will also be asymmetric in this case. These asymmetric currents induce undesired signals in the TMD receivers that can be many times larger than the expected signals from the formation.

U.S. Pat. No. 5,041,975 (assigned to the present assignee) discloses a technique for processing data from downhole measurements to correct for borehole effects. U.S. Pat. No. 5,058,077 discloses a technique for processing downhole sensor data to compensate for the effect of eccentric rotation on the sensor while drilling. U.S. Pat. No. 6,541,979 (assigned to the present assignee) discloses techniques for reducing the effect of borehole eccentricity, using mathematical corrections for the borehole currents effects.

U.S. Pat. No. 6,573,722 (assigned to the present assignee) discloses methods to reduce the effect of tool eccentricity in the borehole by minimizing the borehole currents passing the TMD antennas. This patent is hereby incorporated by reference. In one embodiment, an electrode located below the TMD antenna is hard-wired to another electrode located above the TMD antenna to provide a conductive path behind the TMD antenna. This additional conductive path reduces the amount of borehole currents passing in front of the TMD antenna, and thus minimizes the undesirable effects. In another embodiment, a tool is disclosed that generates a localized current in the borehole (between the two electrodes located on either side of a TMD antenna) that counteracts or cancels out the undesirable borehole currents. Further examples of methods and apparatus for reducing the borehole current effects include U.S. Pat. Nos. 6,573,722 B2, 6,624,634 B2, 6,693,430 B2, 6,680,613 B2, 6,710,601 B2, all of which are issued to Rosthal et al. and assigned to the assignee of the present invention, and published U.S. Patent Applications Ser. Nos. 2003/0146753 A1 and 2003/0155924 A1, both of which are by Rosthal et al. and assigned to the assignee of the present invention.

While these prior art methods are effective in reducing borehole effects on induction tools, there remains a need for further improvements in the design of induction tools that are less affected by tool eccentricity in the borehole. Experimental studies showed that the strategy of canceling current flow up and down the borehole did not give satisfactory performance. Large electrodes can produce a temperature-dependent error signal, so it is preferable to use small electrodes.

SUMMARY OF INVENTION

One aspect of the invention relates to induction tools. An induction tool in accordance with one embodiment of the invention includes a conductive mandrel; at least one array comprising a transmitter, a bucking coil, and a receiver disposed in an insulating tool body surrounding the conductive mandrel; and an electrode disposed in the insulating tool body at a selected location between the bucking coil and the receiver, wherein the selected location is spaced from the transmitter at a distance corresponding approximately to a harmonic mean of a distance between the transmitter and the bucking coil and a distance between the transmitter and the receiver, and wherein the electrode includes a contact connecting it to the conductive mandrel.

Another aspect of the invention relates to methods for designing induction tools. A method in accordance with one embodiment of the invention includes disposing at least one array comprising a transmitter, a bucking coil, and a receiver on an insulating tool body surrounding a conductive mandrel of the induction tool; determining a location of null sensitivity, wherein the location of null sensitivity is located at a harmonic mean of a distance between the transmitter and the bucking coil and a distance between the transmitter and the receiver; and disposing a small electrode on the insulating tool body proximate the location of null sensitivity, wherein a conductive path is formed between the electrode and the conductive mandrel.

Other aspects and advantages of the invention will be apparent from the following description and the appended claims.

BRIEF DESCRIPTION OF DRAWINGS

FIG. 10 shows the effects of eccentering on a tool shown in FIG. 7 as compared with an insulating-body tool and a metal-body tool.

FIG. 12 shows the ability of a tool shown in FIG. 7 to measure formation anisotropy in the presence of tool eccentering, as compared with an insulating-body tool and a metal-body tool.

DETAILED DESCRIPTION

Embodiments of the invention relate to induction logging tools that are less affected by borehole effects. Because the distinction between an induction tool and a propagation tool is not germane to this invention, the term "induction tool" is used in this description to include both the induction and propagation tools. Similarly, borehole effects and tool eccentering effects (or eccentricity effects) are used interchangeably in this description because the distinction between them is not germane. One of ordinary skill would appreciate that conductivity is an inverse of the resistivity, and, therefore, any reference to "conductivity" in this description is intended to include its inverse, the "resistivity," and vice versa.

As noted above, induction arrays with magnetic moments perpendicular (i.e., transverse) to the axis of the borehole are more sensitive to the borehole effects. In addition, the sensitivity of a transverse coil to eccentricity is very different depending on whether the eccentricity is in the direction of the magnetic moment or perpendicular to the magnetic moment. In this description, a transverse array is used in a broad sense to include any array having a transverse component in its magnetic moment. For example, an array having a tilted coil (i.e., a coil not parallel or perpendicular to the axis of the tool) will have a transverse component in its magnetic moment and, therefore, may be referred to as a transverse array in this description. Note that a triaxial array includes two transverse arrays and, therefore, the following description about a transverse array is also applicable to the "transverse components" in a triaxial array.

Figure 1A:
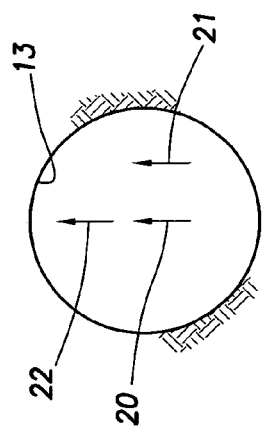
FIGS. 1a and 1b, respectively, illustrate tool eccentering of a transverse array and the asymmetric current distribution that causes the undesired borehole effects.
Figure 1B:
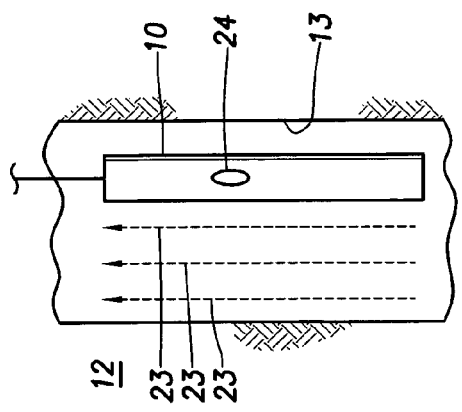

FIG. 1a illustrates that a logging tool may have its transverse or tilted magnetic dipole (TMD) antenna located at the center (shown as 20) of the borehole 13 or eccentered in a parallel direction (shown as 22) or a perpendicular direction (shown as 21). The parallel or perpendicular direction is with respect to the direction of the magnetic dipole of the antenna. Parallel eccentering 22 produces eddy currents up and down the borehole. However, due to the symmetry, no net current flows up or down the borehole. Thus, a tool having its TMD antenna eccentered in the parallel direction 22 does not produce undesired effects more than a tool having its TMD antenna perfectly at the center of the borehole 20 does. In contrast, a tool having its TMD antenna eccentered in the perpendicular direction 21 induces eddy currents to flow up and down the borehole, but without the symmetry to cancel out the up and down currents. As a result, perpendicular eccentering 21 gives rise to significant borehole currents 23, as shown in FIG. 1b. The current flow in the formation is also asymmetric in this case. The asymmetric current distribution produces a strong signal in a receiver 24 disposed on the resistivity instrument 10.

The perpendicular eccentering 21 and parallel eccentering 22 shown in FIG. 1a illustrate the extremes of tool displacements from the center of the borehole 20. In a typical case, the eccentering would likely lie between these two extremes, i.e., eccentering in a direction that is a combination of both the x and y directions.

A typical induction tool, such as the AIT™ tool from Schlumberger Technology Corp. (Houston, Tex.), includes several induction arrays comprising a common transmitter and several receivers spaced apart from the transmitter. Induction tools may also include electrodes in addition to coils, as described for example in U.S. Pat. Nos. 6,573,722, 6,680,613, and 6,710,601 issued to Rosthal et al. Examples of such induction tools are described in U.S. Pat. No. 4,873,488 issued to Barber et al. and U.S. Pat. No. 5,041,975 issued to Minerbo et al. In a typical induction tool, each main receiver in the array may be connected in series with a bucking coil. The function of a bucking coil is to cancel the direct coupling between the transmitter and the receiver.

When the bucking coil is optimized, the receiver should produce no signal in a medium with zero conductivity (e.g., air); this condition is referred to as mutual balance. One of ordinary skill in the art would appreciate that the number of turns of the bucking coil and the spacing between the transmitter and the bucking coil may be properly selected to provide an optimal cancellation of the direct coupling between the transmitter and the main receiver.

Figure 2:
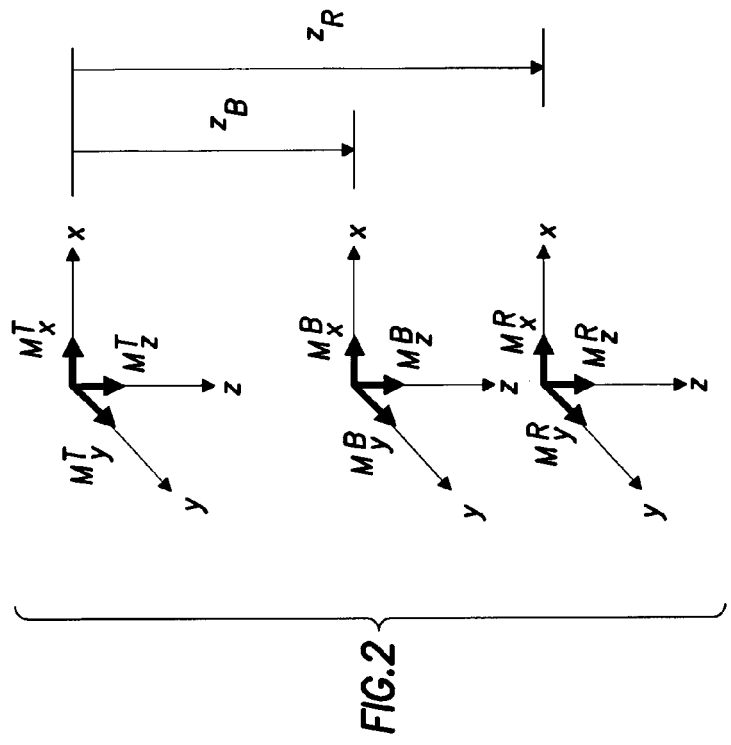
FIG. 2 shows a schematic of a triaxial array.

Referring to FIG. 2, the mutual balance condition can be express approximately as $$M_z^B = -\left(\frac{z_B}{z_R}\right)^3 M_z^R \qquad (1)$$

where $$M_z^B, M_z^R$$

are the magnetic moments in the z-direction for the bucking and the main receiver coils, respectively, and $Z_B$, $Z_R$ are the distances (spacings) from the transmitter for the bucking and the receiver coils, respectively. For a triaxial array, the same condition applies to the x and y couplings.

Modern induction tools often include one or more triaxial arrays, in which the transmitter, the main receiver, and the bucking coil each may include three coils (antennas) in different orientations (typically, in orthogonal directions). FIG. 2 illustrates a schematic of a typical triaxial array, which includes a transmitter (T), a main receiver (R), and a bucking coil (B). As shown, each of the transmitter, main receiver, and bucking coil has three separate coils, which have magnetic moments in orthogonal directions. The three magnetic moments of the transmitter (T) are shown as $M_x^T$, $M_y^T$, $M_z^T$.

The three magnetic moments of the main receiver are shown as $M_x^R$, $M_y^R$, $M_z^R$.

The three magnetic moments of the bucking coils are shown as $M_x^B$, $M_y^B$, $M_z^B$.

Because the transmitter and the receiver in a triaxial array each include three antennas (see FIG. 2), nine complex voltages would be recorded using a triaxial array, giving a matrix of apparent conductivities as follows:

$$\begin{bmatrix} \sigma_{xx} & \sigma_{xy} & \sigma_{xz} \\ \sigma_{yx} & \sigma_{yy} & \sigma_{yz} \\ \sigma_{zx} & \sigma_{zy} & \sigma_{zz} \end{bmatrix}.$$

Figure 3:
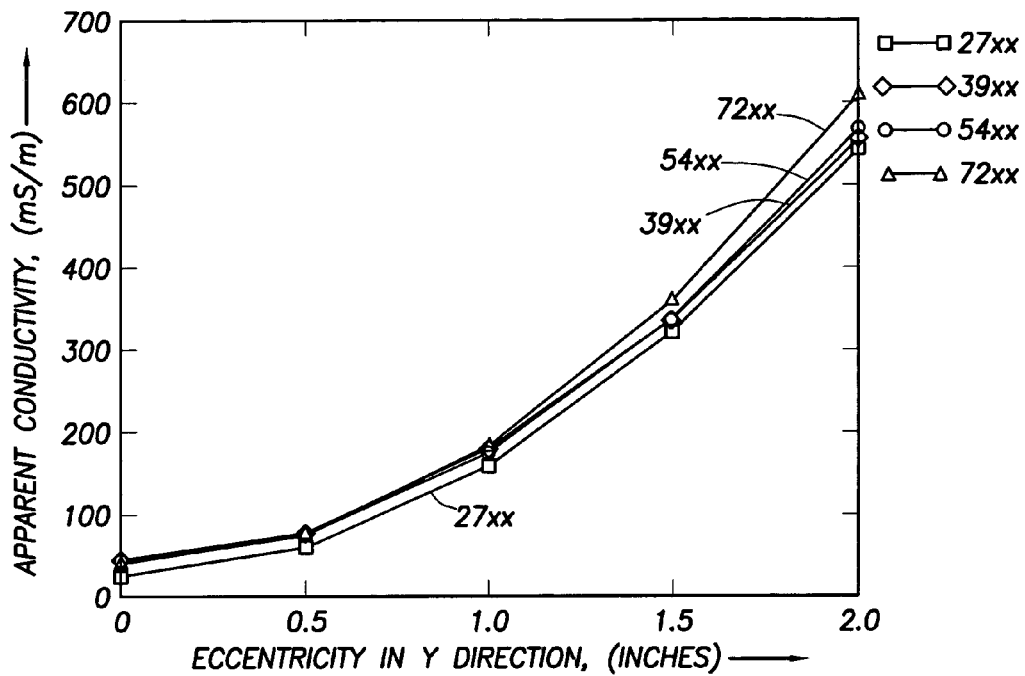
FIG. 3 shows the effects of eccentering on various transverse XX arrays on an insulating-body induction tool.

Because these nine couplings are obtained with antennas in different directions, they will be affected by tool eccentering or borehole effects to different extents. FIG. 3 illustrates simulated voltage measurements for various couplings of triaxial arrays in a tool with an insulating body (not shown). The spacings between the transmitter and the main receiver coils are 27, 39, 54, and 72 inches. The frequency of operation is 26.8 kHz for all calculations and measurements in this description.

In FIG. 3, the computed R signals of XX couplings from various arrays are plotted against the tool displacement (eccentering) along the y axis in the borehole. The borehole has a diameter of 8.5 inches and is filled with a mud having a conductivity of 5000 mS/m. It is apparent from FIG. 3 that the errors in the XX signals are large, as compared to the formation conductivity, 50 mS/m. In a conductive mud, for displacement (eccentering) along the y axis, the errors in the XX couplings are much larger than the errors in the YY couplings. See U.S. Pat. No. 6,573,722 issued to Rosthal et al. and U.S. Pat. No. 6,556,015 issued to Omeragic et al.

Figure 4:
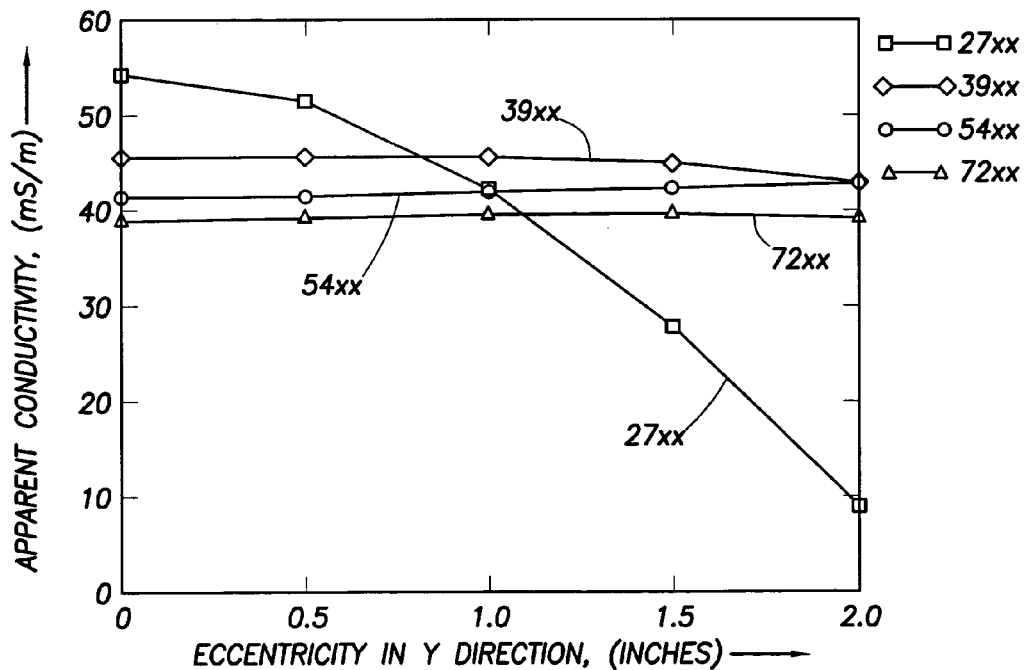
FIG. 4 shows the effects of eccentering on various transverse XX arrays on a conductive-body induction tool.

The borehole effects as seen in FIG. 3 can be minimized if a conductive tool body (e.g., metal body) is used. FIG. 4 shows the eccentricity effect of a metal-body tool (not shown) in a conductive borehole. The R signals of the XX couplings for the four transmitter-receiver spacings are plotted against the tool displacement (eccentering) along the y direction in the borehole. For the longer spacings 39", 54" and 72", the XX couplings are almost independent of tool eccentricity. However, the shorter spacing array 27XX is still significantly affected by tool eccentering.

While a metal body can provide effective reduction in borehole effects, the metal body gives rise to temperature-dependent errors in the measurements. An alternative to metal body tool design is disclosed in a co-pending application Ser. No. 10/604,622 filed on Aug. 5, 2003 by Barer et al. and U.S. Pat. No. 6,667,620 granted Dec. 23, 2003 by Homan et al. The induction tools disclosed in these applications have insulating housings (tool body) for the receiver coils. The insulating body includes conducting electrodes (ring electrodes or fingered electrodes) disposed between the transmitter and receiver coils; the conductive electrodes are electrically grounded to the metallic central support mandrel. These electrodes prevent the asymmetric flow of current in the borehole, reducing the error contributions of tool eccentering to the XX, and YY couplings. With these designs, the eccentricity effect is substantially reduced compared with the insulating-body tool. However these designs give insufficient cancellation of the eccentricity effects in larger boreholes. In addition, this type of electrode complicates the response of short-spacing measurements even when the tool is centralized in the borehole.

Embodiments of the invention improve the design of an induction tool by using a number of electrodes disposed between the transmitter and the receivers. To understand the contribution of a plurality of electrodes in an insulating tool body, a hypothetical tool with an increasing number of electrodes is modeled (FIG. 5).

Figure 5:
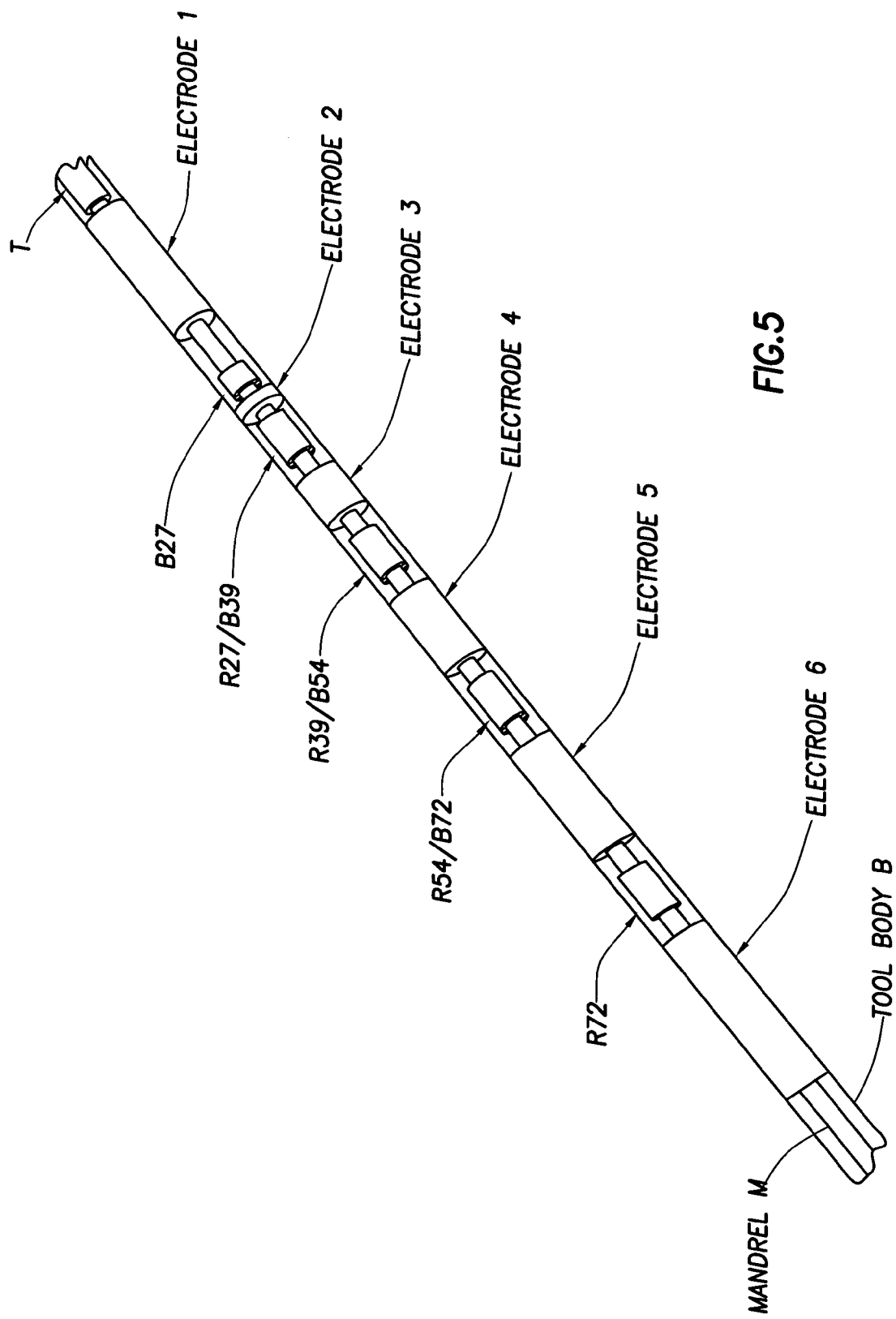
FIG. 5 shows an induction tool in accordance with one embodiment of the invention.

The induction tool shown in FIG. 5 includes a conductive mandrel M, a tool body B, and several arrays. The arrays include a common transmitter T and a series of main receivers at 27", 39" 54", and 72" spacings, designated as R27, R39, R54, and R72, respectively. In addition, corresponding bucking coils, B27, B39, B54, and B72 are included to reduce mutual couplings between the transmitter and the main receivers. Several electrodes (electrode 1–6) designed to reduce borehole effects are also shown on the tool. The following simulations are performed with various electrodes (electrode 1–6) included to study the contribution of these electrodes to borehole effect reduction. In the first calculation, only electrode 1 is present. In the second calculation, only electrodes 1 and 2 are present, and so forth.

Figure 6:
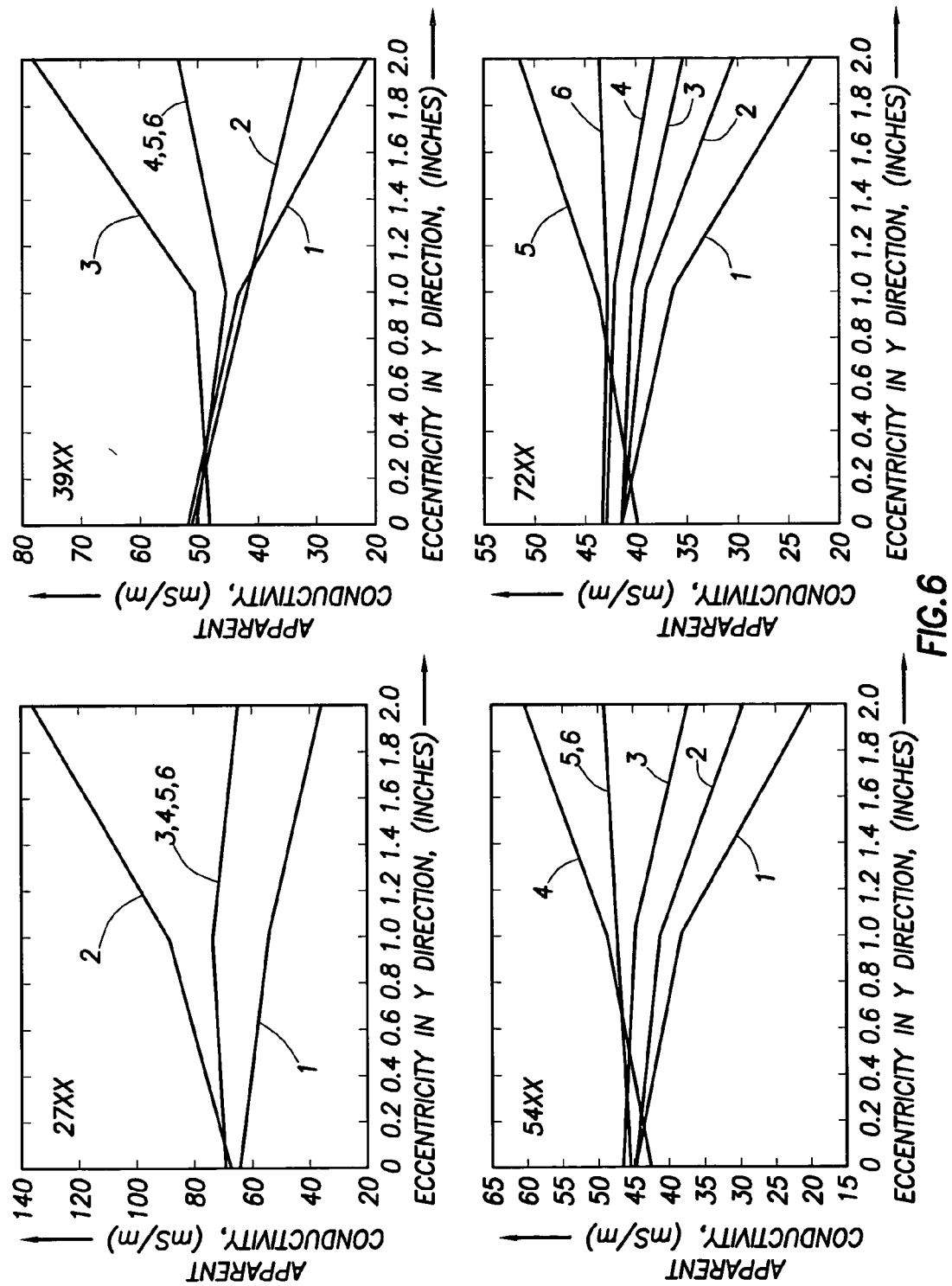
FIG. 6 shows results from simulations of tools as shown in FIG. 5 having different numbers of electrodes disposed on the tool body.

FIG. 6 shows the transverse eccentricity effect for four receiver spacings with an increasing number of electrodes (curves 1–6 correspond to the numbers of electrodes in each panel). As shown in FIG. 6, the 27XX coupling needs to have the first three electrodes (electrodes 1–3 in FIG. 5) to have stable measurements regardless of tool eccentering. The 39XX coupling needs to have at least four electrodes (electrodes 1–4 in FIG. 5) to have stable measurements. The 54XX coupling needs to have five electrodes (electrodes 1–4 in FIG. 5) to have stable measurements. For the 72XX coupling, all six electrodes are needed to obtain a good cancellation of the eccentricity effect. These results suggest that an electrode is needed above and below every receiver coil. The electrode (i.e., electrode 6) beyond the last receiver (R72) is preferably placed at a location such that this electrode (i.e., electrode 6) and the one (electrode 5) before the last receiver (R72) are situated symmetrically with respect to the receiver (R72). That is, in preferred embodiments, electrode 5 and electrode 6 symmetrically "straddle" or "bestride" receiver R72.

In addition, it was found that additional electrodes may be included above and below the transmitter T to improve the borehole effect cancellation. In preferred embodiments, the electrodes above and below the transmitter are symmetrically positioned around the transmitter to provide good borehole effect cancellation. In some embodiments, there are two electrodes each above and below the transmitter to improve the borehole effect cancellation (see e.g., T1–T4 in FIG. 7). In some embodiments, the electrodes above and below the transmitter have longer axial (longitudinal) span than other electrodes. In some embodiments, the electrodes above and below the transmitter are placed close to the transmitter.

Multi-electrode Tool Design

The above simulation reveals where the electrodes should be placed, i.e., one each at above and below each receiver. However, large electrodes on an induction array may contribute unacceptable errors on the measured voltages (on both in-phase and quadrature components). These errors may not be easily corrected because these errors depend on temperature, and mechanical motion of the electrodes relative to the coils. Therefore, a study was performed to see whether the borehole effect can be cancelled using small electrodes strategically placed on the induction sonde.

The sensitivity of the measurements due to a small inhomogeneity near the sonde body can be predicted approximately by Doll's geometrical factor. See J. H. Moran and K. S. Kunz, "*Basic Theory of Induction Logging and Application to the Study of Two-Coil Sondes*," Geophysics, Vol. 6, pp. 829–58, December 1962; and H. G. Doll, "*Introduction to Induction Logging and Application to Logging of Wells Drilled with Oil Base Mud*," J. Petroleum Technology, Vol. 1, No. 6, pp. 148–62, June 1949. A small inhomogeneity at vertical position z produces a voltage change $(\Delta V_{XX})$ in the coaxial receiver voltage $V_{XX}$ proportional to $$\Delta V_{tt} \propto \frac{M_t^T}{z^3}\left(\frac{M_t^R}{|z-z_R|^3} + \frac{M_t^B}{|z-z_B|^3}\right). \qquad (2)$$

All the terms in Equation (2) have the similar meanings as those described above with reference to FIG. 2. This function has a zero at a position $z_0$ obtained by solving $$\frac{M_t^R}{|z-z_R|^3} = -\frac{M_t^B}{|z-z_B|^3}. \qquad (3)$$

Because of the mutual balance condition in equation (1), we can write $$\frac{z_R^3}{|z_0 - z_R|^3} = \frac{z_B^3}{|z_0 - z_B|^3}, \quad (4)$$

or, equivalently, $$1 - z_0/z_R = z_0/z_B - 1, \quad (5)$$

which gives $$z_0 = \frac{2}{\frac{1}{z_B} + \frac{1}{z_R}}. \quad (6)$$

Equation (6) shows that the position of null sensitivity, $z_0$, is at the harmonic mean of $z_B$ and $z_R$.

In other words, the distance of the location of null sensitivity from the transmitter is a harmonic mean of the distances from the transmitter to the bucking coil and to the main receiver. The XX and YY couplings also have null sensitivity near this position. Note that Equation (6) gives an exact null sensitivity location for point dipole antennas in air. However, it will only give an approximate location for an actual tool.

Figure 7:
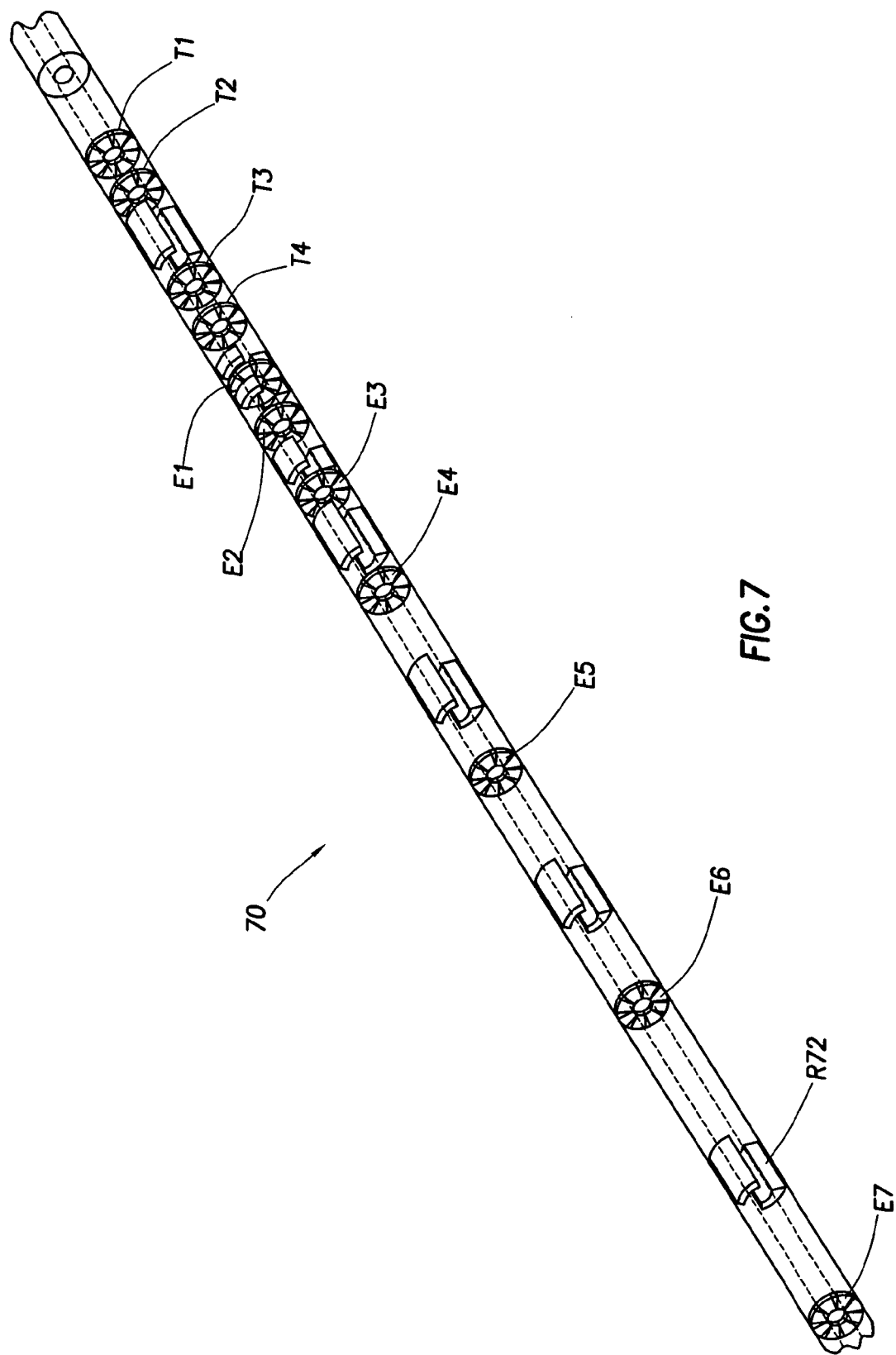
FIG. 7 shows an induction tool having small electrodes in accordance with one embodiment of the invention.

FIG. 7 shows an induction tool in accordance with one embodiment of the invention. The induction tool 70 includes a small electrode near the position of null sensitivity for each receiver. The term "small electrode" means the electrode has a small (e.g., 1") axial (longitudinal) span (cf FIG. 5 and FIG. 7). These small electrodes constitute a smaller portion of the tool body (lengthwise) and, therefore, will introduce less temperature-dependent errors into the induction measurements. In this description, an induction tool having a plurality of small electrodes including electrodes disposed at the null sensitivity locations is referred to as a "multi-electrode" induction tool. This term is used to differentiate it from a prior art metal-body induction tool or an insulating-body induction tool.

As shown in FIG. 7, a small electrode E7 is also placed below the farthest receiver R72, and four small electrodes T1–T4 are placed around the transmitter T. In preferred embodiments, the electrode above E6 and below E7 the farthest receiver R72 are substantially equally spaced from the receiver R72. Likewise, the electrodes above (T1, T2) and below (T3, T4) the transmitter T are substantially equally spaced from the transmitter. Note that while four electrodes (T1–T4) are shown, other numbers of electrodes may also be included around the transmitter T. Further, each of the electrode may be a continuous ring electrode, a segmented ring electrode, a continuous finger electrode, a segmented finger electrode, or a plurality of button electrodes arranged around the circumference of the tool body and interspersed with an insulating material.

Figure 8C:
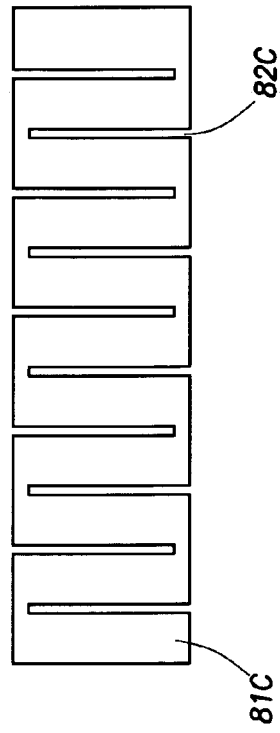
FIGS. 8C and 8D show other embodiments of a fingered electrode that may be used with embodiments of the invention.
Figure 8D:
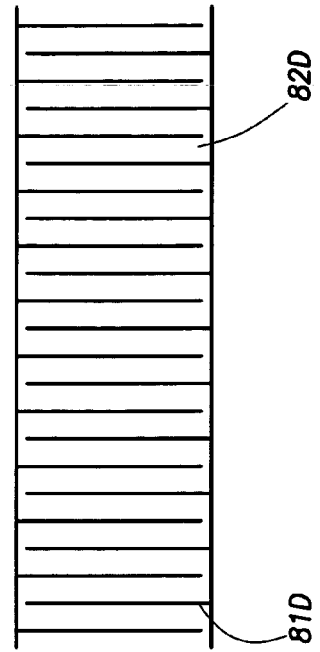
Figure 8A:
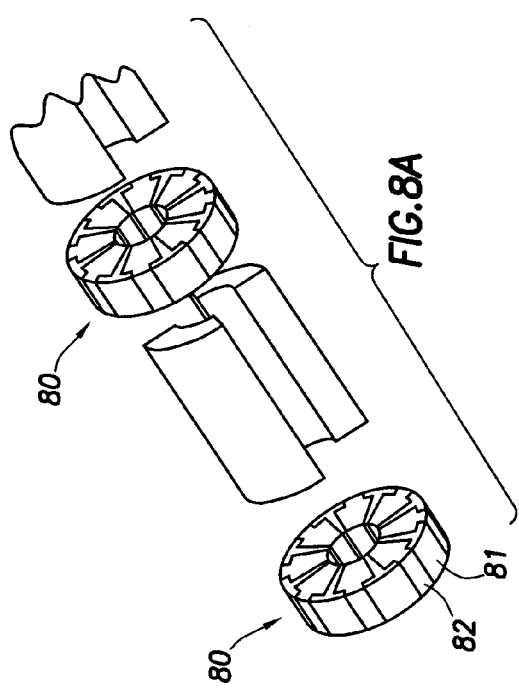
FIG. 8A shows enlarged view of electrodes in accordance with one embodiment of the invention.

FIG. 8A shows two small (short axial span) electrodes 80 for use on an induction tool in accordance with one embodiment of the invention. As shown, the electrode 80 comprises a plurality of (eight) segmented electrodes (or button electrodes) 81 interspersed with eight sections of an insulation material 82 to form a ring that is disposed at the null sensitivity location shown in FIG. 7. Note that while this example shows eight button electrodes, one of ordinary skill in the art would appreciate that other numbers of button electrode/insulating material sections may also be used. Therefore, the particular number of button electrodes and the shapes and sizes of the button electrodes shown are not intended to limit the invention.

The electrode 80 shown in FIG. 8A will conduct currents from the borehole into the conductive mandrel (not shown), via contacts 81, but will not conduct currents in the azimuthal direction. Several variations of such an electrode are possible, including different numbers, shapes, and sizes of electrodes. As noted above, the electrode may be made of a ring electrode or a segmented ring electrode, i.e., with segmentations in the azimuthal direction and the gaps filled with an insulating material. The segmented ring electrode will not permit currents to flow in the azimuthal direction. This further minimizes interference with the induction measurements. In addition, if it is desirable to have electrodes with a larger longitudinal span (along the axial direction of the tool), the electrode may be preferably made of metallic fingers.

Figure 8B:
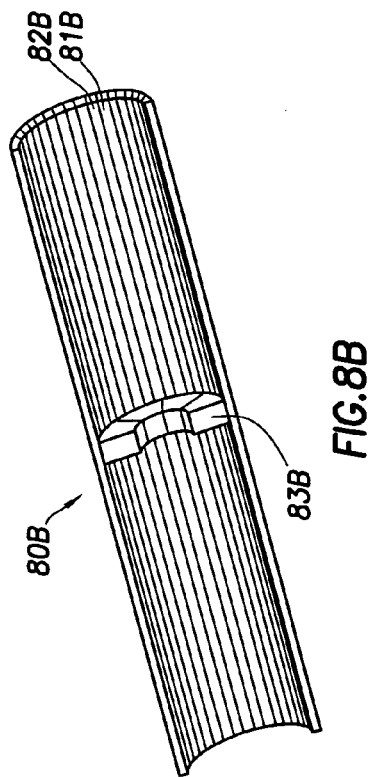
FIG. 8B shows a sectional view of a fingered electrode that may be used with embodiment of the invention.

FIG. 8B shows an example of a fingered electrode that may be used with embodiments of the invention. As shown, a cross section of the fingered electrode 80B comprise one or more conductive wires arranged in the shape of fingers 81B interspersed with a plurality of insulating sections 82B. The conductive fingers 81B are connected to the conductive mandrel (not shown) by a plurality of contacts (connectors) 83B.

FIG. 8C shows a variant of a fingered electrode designed to allow current to flow from borehole to mandrel, while minimizing eddy currents in the electrode itself. This particular embodiment may be conveniently manufactured from a conductive sheet 81C by creating a plurality of gaps 82C from the top and the bottom in an alternating pattern. This variant of "fingered" electrode may be wrapped around the tool body without forming a complete circumference (i.e., with at least one gap) so that current cannot flow in the azimuthal (circumferential) direction. In this case only one contact (e.g., 83B in FIG. 8B) is needed to create a conductive path to the inner conductive mandrel.

FIG. 8D shows another example of a fingered electrode. In this example, two sets of conductive wires (fingers) 81D are printed on an insulating material 82D. One set of fingers 81D are connected on the top, while the second set of fingers 81D are connected at the bottom. The first set and the second set of fingers may be interspersed without contacting each other. Again, this embodiment may be wrapped around the tool body, preferably with at least one gap to avoid current flows in the azimuthal direction. This particular configuration of "fingered" electrode is similar to the Faraday shield disclosed in FIG. 4 of U.S. Pat. No. 6,667,620, which is issued to Homan et al. and assigned to the present assignee. This patent also discloses methods for making such electrodes using print circuit technologies. This patent is hereby incorporated by reference in its entirety. One of ordinary skill in the art would appreciate the fingered electrodes shown in FIGS. 8B–8D are for illustration only and other modifications are possible without departing from the scope of the invention. In addition, one of ordinary skill in the art would appreciate that the thickness of the conductive sheet/wire that forms the conductive "fingers" and the density of the "fingers" may be varied, depending on particular configurations of the tools, to optimize the reduction of the borehole effects with minimum interference with the EM measurements. Furthermore, while these examples show that the "fingers" are oriented in the longitudinal direction, it is also possible to have the fingers oriented in other direction (e.g., in the transverse direction).

Figure 9:
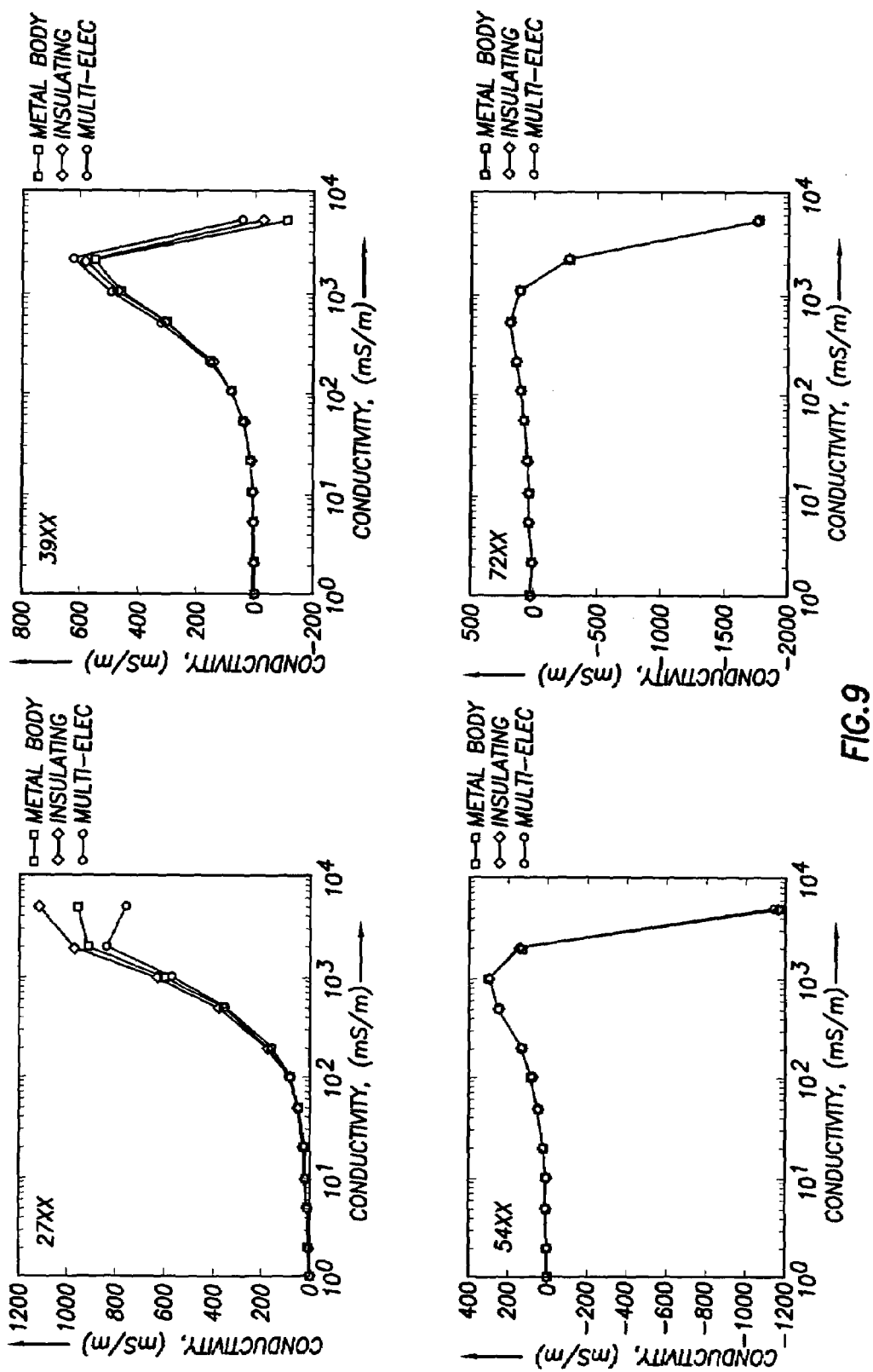
FIG. 9 shows simulated measurements using a tool shown in FIG. 7 in accordance with one embodiment of the invention.

The properties of a tool in accordance with embodiments of the invention, such as the "multi-electrode" tool shown in FIG. 7, are studied with finite-element analysis and compared with prior art tools. FIG. 9 shows results of the finite-element calculations of responses in a homogeneous (isotropic) medium for four measurements 27XX, 39XX, 54XX, and 72XX arrays on three different types of tools: a multi-electrode tool, a metal-body tool, and an insulating-body tool. It is apparent from FIG. 9 that the multi-electrode tool in accordance with embodiments of the invention can produce measurements essentially the same as those of the metal-body or insulating body induction tools.

FIG. 10 shows the eccentricity responses of 27XX, 39XX, 54XX, and 72XX measurements made by the same three different types of induction tools in an 8.5-inch diameter borehole. The formation conductivity is 50 mS/m and the mud conductivity is 5000 mS/m. It is clear from FIG. 10 that the behavior of the multi-electrode induction tool is similar to that of the metal-body tool in most situations. Both the multi-electrode tool and the metal-body tool are more insensitive to tool eccentering than the insulating-body tool.

Figure 11:
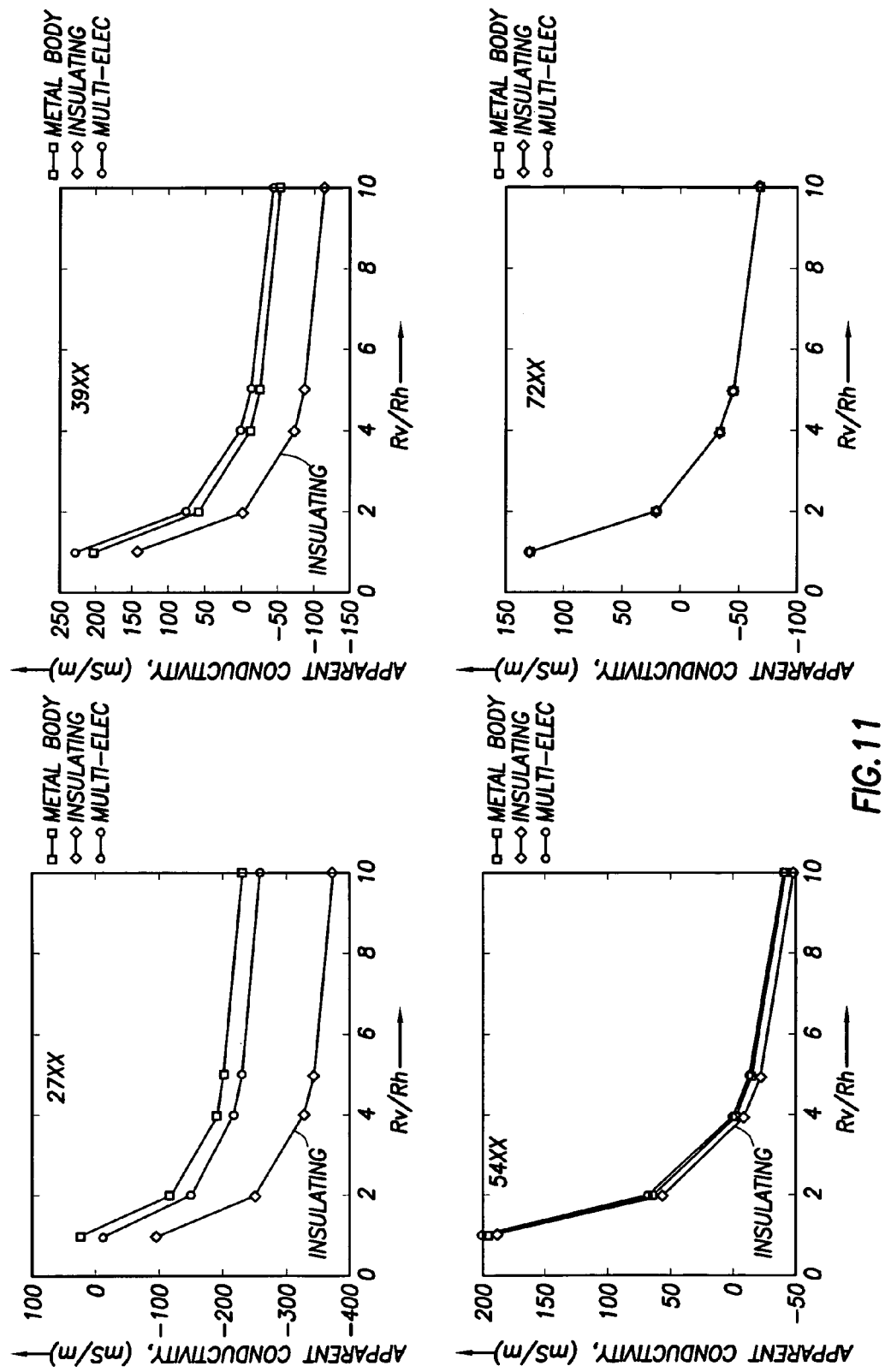
FIG. 11 shows the ability of a tool shown in FIG. 7 to measure formation anisotropy, as compared with an insulating-body tool and a metal-body tool.

Transverse arrays are developed because they are sensitive to formation resistivity in the vertical direction. One main use of the transverse array is in the measurement of resistivity of anisotropic formations. Therefore, it is important that the inclusion of multi-electrodes does not degrade their ability to measure the vertical resistivity in anisotropic formations. FIG. 11 shows the responses of 27XX, 39XX, 54XX, and 72XX measurements in an anisotropic formation with the tool centralized in a conductive 16-inch diameter borehole. The tool is centralized in a 16-inch diameter borehole with a mud conductivity of 5000 mS/m. The formation horizontal conductivity is 500 mS/m. The ratio of vertical resistivity ($R_v$) to horizontal resistivity ($R_h$), $R_v/R_h$, is varied from 1 to 10 in this study. The anisotropy responses of the multi-electrode tool are preserved, and are close to those of a metal-body tool.

FIG. 11 shows that the multi-electrode tool is useful in measuring resistivities in an anisotropic formation when the tool is centered in the borehole. To be useful, the ability of these tools to measure anisotropic resistivity should not be degraded by the tool eccentering. FIG. 12 shows the responses of 27XX, 39XX, 54XX, and 72XX measurements in an anisotropic formation with three types of tools decentralized by 4 inches along the y direction in a conductive 16-inch diameter borehole having a mud conductivity of 5000 mS/m. The formation horizontal conductivity is 500 mS/m. The ratio $R_v/R_h$ is varied from 1 to 10 in this study. The anisotropy responses of the multi-electrode tool are similar to those of the metal-body tool. Both the multi-electrode tool and the metal-body tool are sensitive to a wider range of anisotropy, as compared with the insulating-body tool. The eccentered insulating-body tool could not give a reliable indication of $R_v/R_h$, as seen by comparing FIGS. 11 and 12.

Effect of Borehole on Vertical Response

In a typical array induction log (e.g., an AIT log), borehole corrections are applied assuming a homogeneous medium outside the borehole. See e.g., U.S. Pat. No. 5,041,975 issued to Minerbo et al. An important issue is whether the borehole effect can be separated from the vertical response of the tool (e.g., shoulder bed effects). Shoulder bed effects occur in thin bed formations, especially when the adjacent beds are more conductive than the bed under investigation. The shoulder bed effects lead to erroneous readings that need to be corrected before an accurate formation resistivity can be derived from the measurements.

Figure 13:
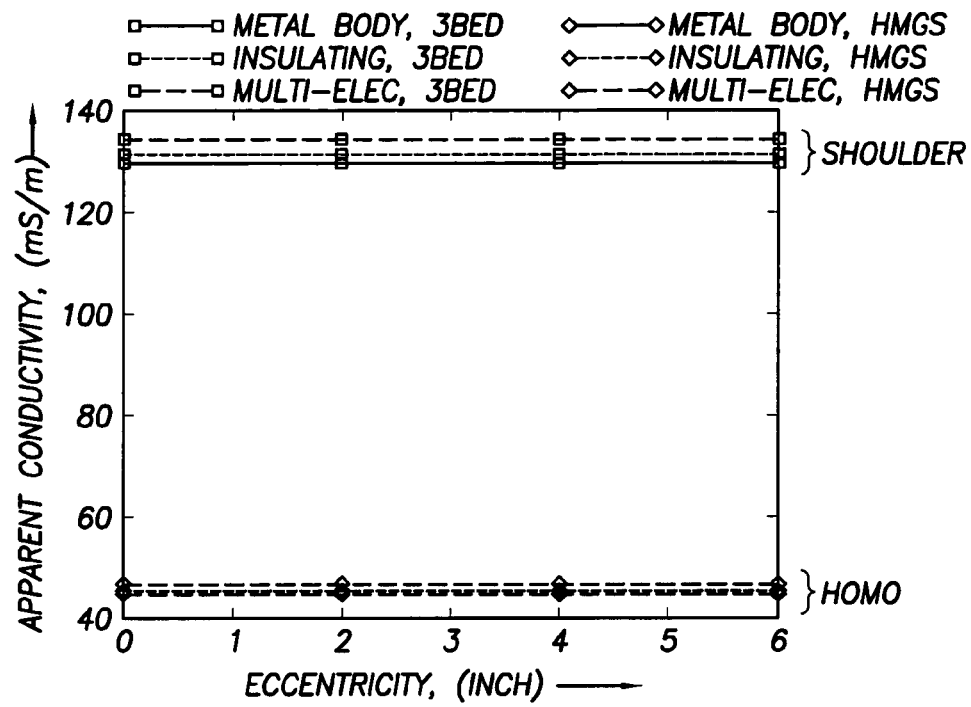
FIG. 13 shows the shoulder-bed effects on a tool shown in FIG. 7, as compared with an insulating-body tool and a metal-body tool.

FIG. 13 shows responses of the 39XX measurements of three different types of tools in a homogeneous medium (50 mS/m) and in a three-layer formation with no borehole. The three-layer formation comprises a 12-foot bed having a conductivity of 50 mS/m, sandwiched between two layers having a conductivity of 1000 mS/m. The results shown are computed by finite-element calculations. As shown in FIG. 13, while all three types of tools produce accurate conductivity (about 50 mS/m) in the homogeneous formation, the tool readings (about 130 mS/m) are all significantly impacted by the presence of more conductive layers above and below the layer of interest (the 12-foot bed).

Figure 14:
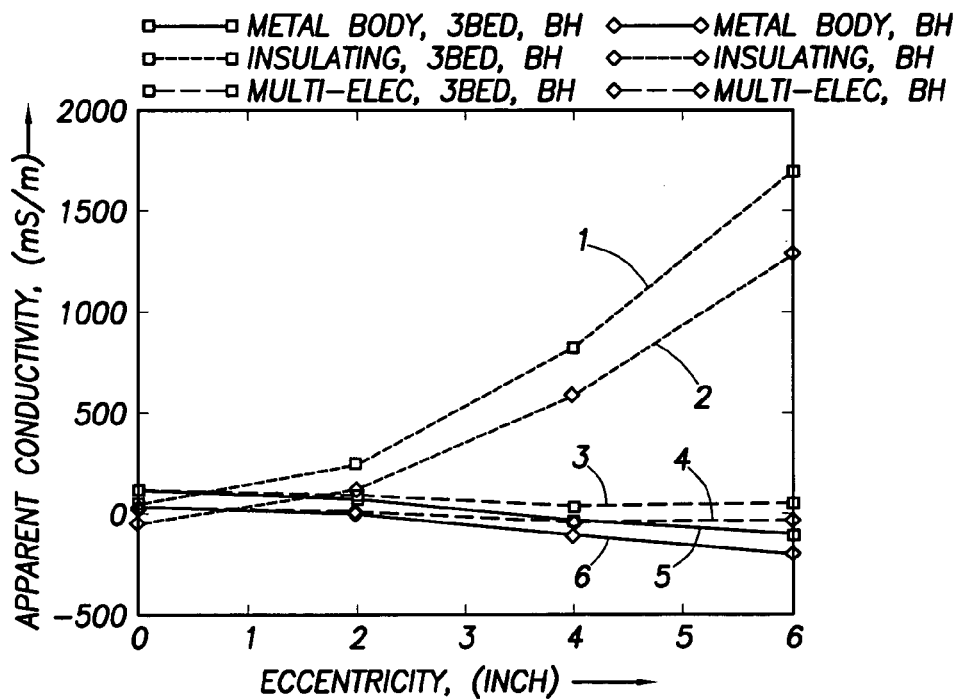
FIG. 14 shows the effects of eccentering and shoulder bed on a tool as shown in FIG. 7, as compared with an insulating-body tool and a metal-body tool.

The shoulder-bed effects, as shown in FIG. 13, can significantly complicate the measurements, especially in the presence of tool eccentering. FIG. 14 shows the eccentricity responses of 39XX arrays in three different types of induction tools in a borehole with and without the shoulder beds. The homogeneous formation has a conductivity of 50 mS/m. The three-layer formation model (shoulder-bed model) has a 12-foot thin bed (50 mS/m), sandwiched between more conductive beds (1000 mS/m). The 16-inch borehole is filled with a mud having a 5000 mS/m conductivity.

As shown in FIG. 14, the insulating tool (curves 1,2) are significantly affected by eccentering effects, regardless of formation types. Note that shoulder-bed effects add different amount of readings to the measurement depending on the tool eccentering, i.e., the difference between curve 1 and curve 2 becomes more pronounced as the tool eccentering increases. In contrast, the metal-body tool (curves 5,6) and the multi-electrode tool (curves 3,4) are less affected by shoulder-bed effects and the shoulder-bed effects seem constant, irrespective of tool eccentering. Thus, a multi-electrode tool in accordance with embodiments of the invention will produce more reliable measurements than an insulating-body tool, and the shoulder-bed effects will be easier to correct.

Figure 15:
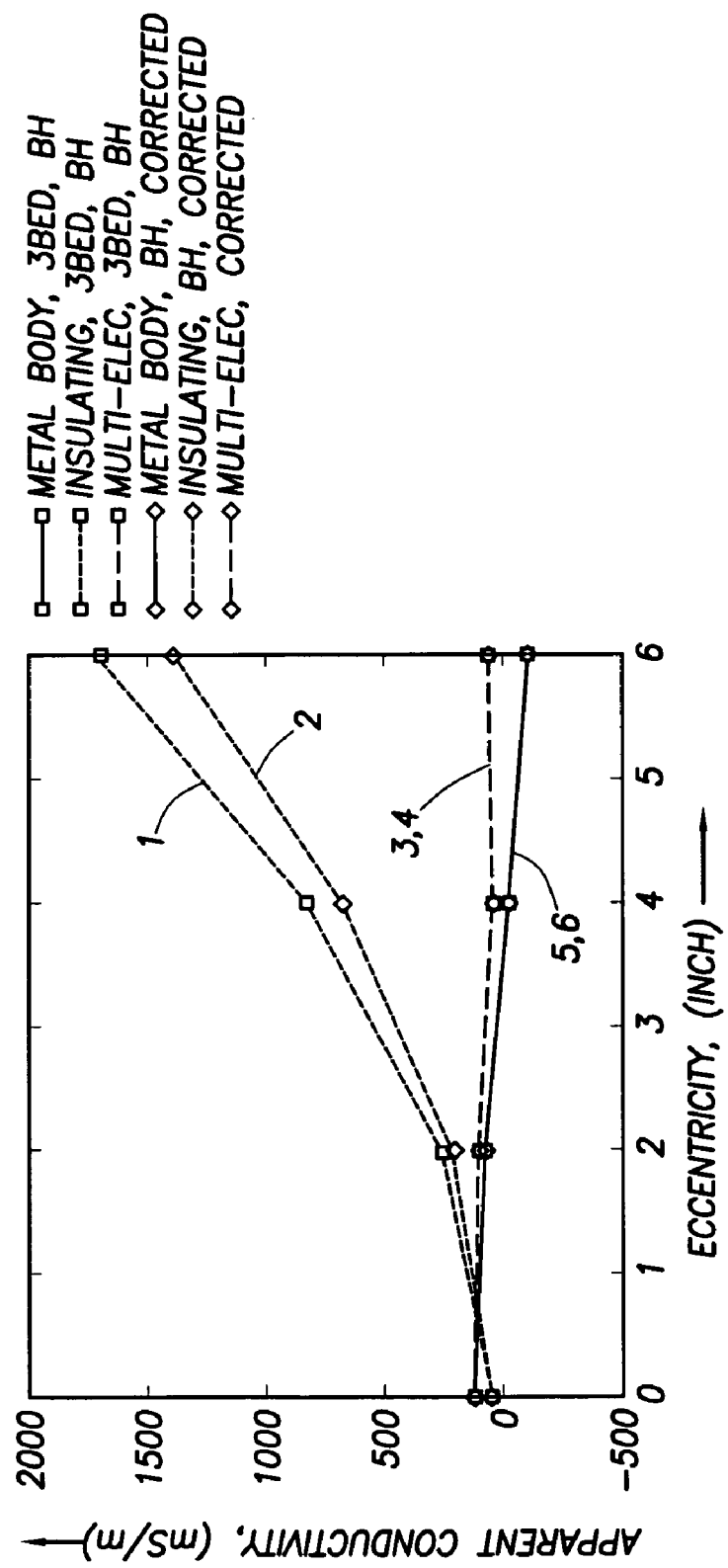
FIG. 15 shows the results of FIG. 14 after removal of shoulder-bed effects of a tool shown in FIG. 7, as compared with an insulating-body tool and a metal-body tool.

FIG. 15 shows the results from shoulder-bed effect corrections of results shown in FIG. 14. As shown, the eccentricity responses of 39XX measurements for the three different types of induction tools are shown with and without shoulder-bed effect correction. Curve 1 shows the response of the insulating-body tool with shoulder-bed effect correction, while curve 2 shows measurement from the same tool in a homogeneous formation. It is apparent that the shoulder-bed effects cannot be correctly removed across different tool eccentricity, i.e., curve 1 is different from curve 2. In other words, the eccentring effects and the shoulder-bed effects are not easily separable with an insulating-body tool. In contrast, the curves (curves 3,5) after shoulder-bed correction are super imposable with the corresponding curves for the homogeneous formation measurements (curves 4,6) for the multi-electrode tool and the metal-body tool. This result indicates that the eccentricity effect and shoulder-bed effect are approximately separable for the multi-electrode tool and the metal-body tool, but not for the insulating-body tool.

Experimental Verification

The above simulations show that a multi-electrode induction tool in accordance with embodiments of the invention produce similar measurements as those of a metal-body tool. The measurements of a multi-electrode tool are less influenced by tool eccentering (borehole effects) or shoulder-bed effects, as compared to measurements of a tool with an insulating body. These computational results have been verified in laboratory measurements on actual tools based on this design.

An experimental prototype similar to the multi-electrode design (e.g., the tool shown in FIG. 7) was built and tested in a large tank filled with tap water (79.2 mS/m). This prototype has 8 short electrodes. The borehole was simulated by a conductive plastic pipe, such as TIVAR™ 1000 from Poly Hi Dolidur (Fort Wayne, Ind.), filled with salt water (6.16 S/m). The internal diameter of the plastic pipe is 13 inches.

Figure 16:
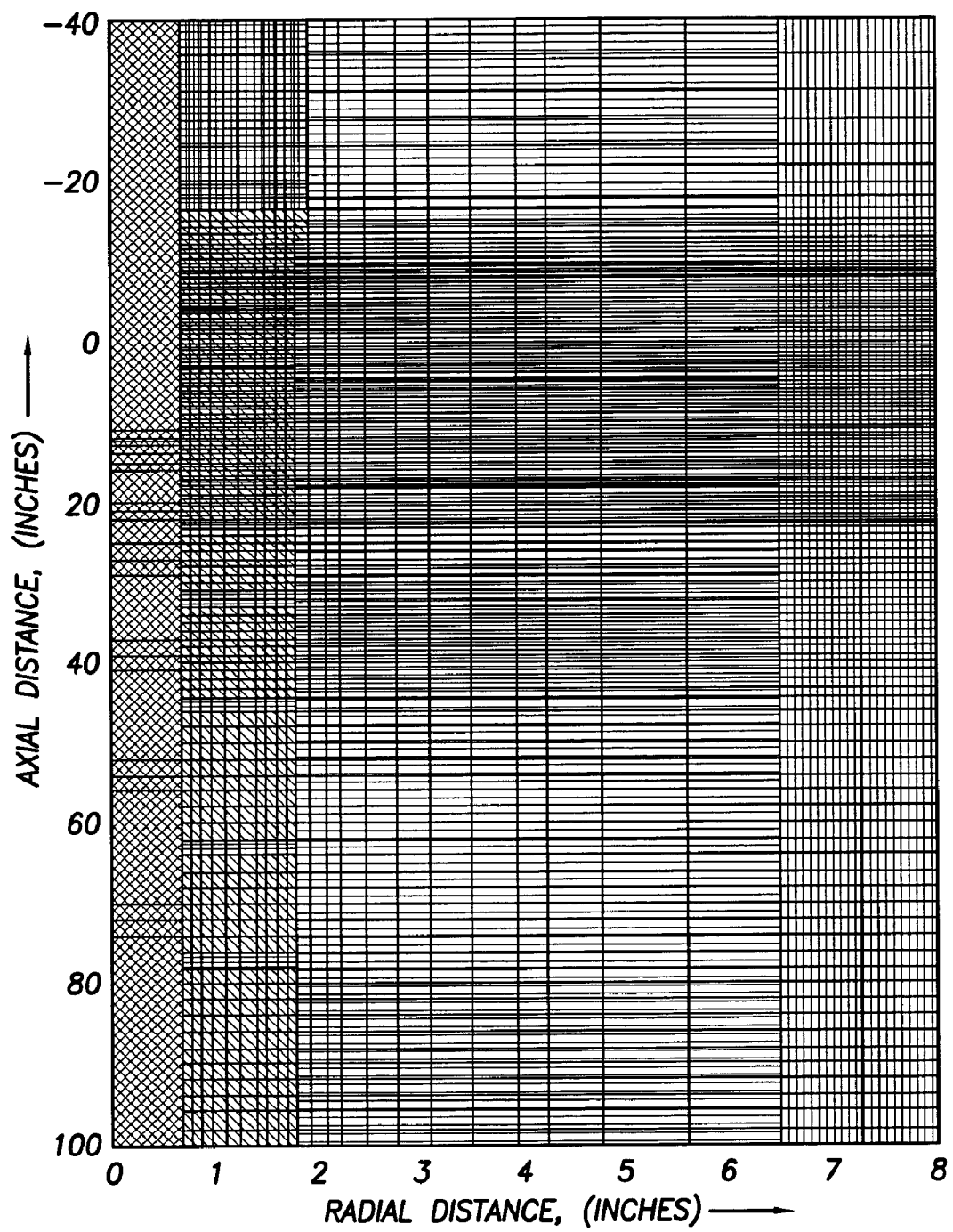
FIG. 16 shows one prototype tool in accordance with one embodiment of the invention.

FIG. 16 shows a finite-difference model of an experimental prototype tool in accordance with one embodiment of the invention. The prototype was designed with SLDMCYL, a 3D cylindrical finite-difference electromagnetic simulator developed at Schlumberger. The electrode between the receiver coils at 15 and 21 inches was omitted, and the prototype has two electrodes surrounding the transmitter, instead of four. The fingered electrodes, of the type shown in FIG. 8A, are modeled as anisotropic cylindrical shells (magenta) having zero conductivity in the azimuthal direction, and a high conductivity in the axial and radial directions. They are connected to the central conductor (orange) by anisotropic disks (cyan) having zero conductivity in the axial and azimuthal directions. This representation of the electrodes is similar to but not equivalent to the segmented electrode model in FIG. 8A.

Figure 17:
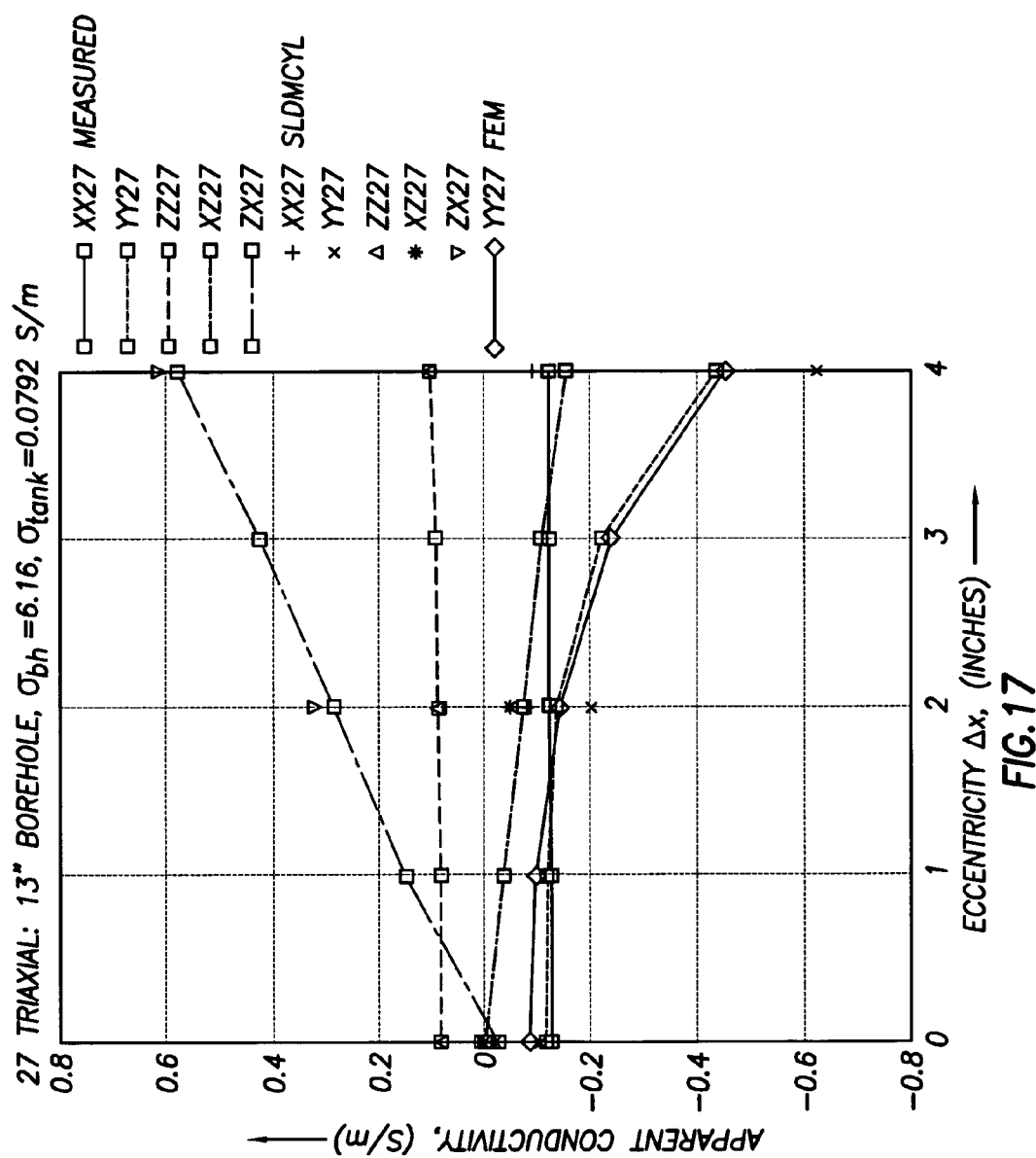
FIG. 17 shows 27" triaxial conductivity measurements in the presence of tool eccentering using a tool shown in FIG. 16, as compared with an insulating-body tool and a metal-body tool.
Figure 18:
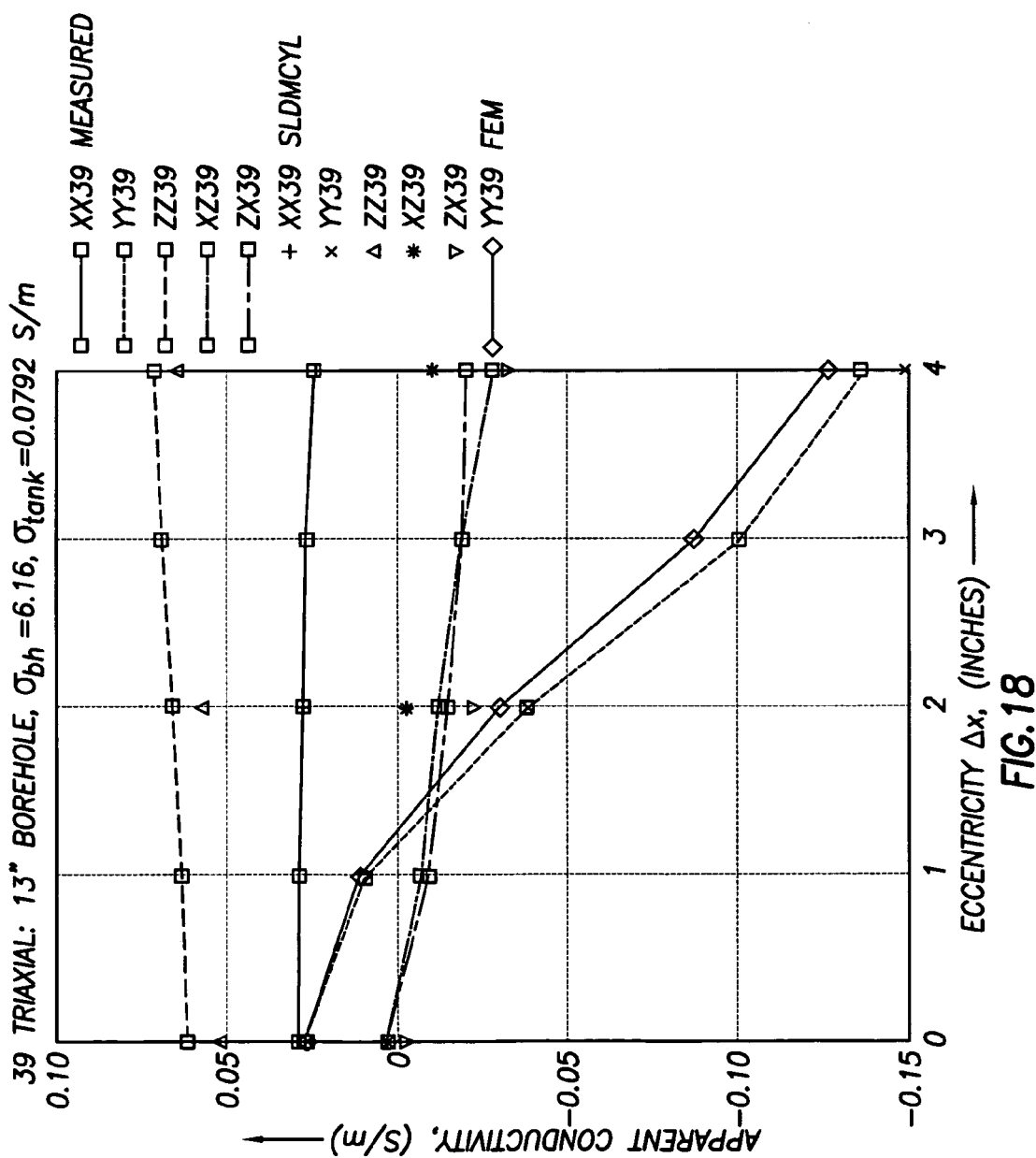
FIG. 18 shows 39" triaxial conductivity measurements in the presence of tool eccentering using a tool shown in FIG. 16, as compared with an insulating-body tool and a metal-body tool.

Modeling indicates that the responses are unaffected by the resistance of the fingers and disks for a reasonable range of resistance. Good agreement between the measurements and calculations was obtained for the 27" receivers (FIG. 17) as well as the 39" (FIG. 18). These tests confirmed that the modeling codes correctly predict the reduction of the borehole effects.

Figure 19:
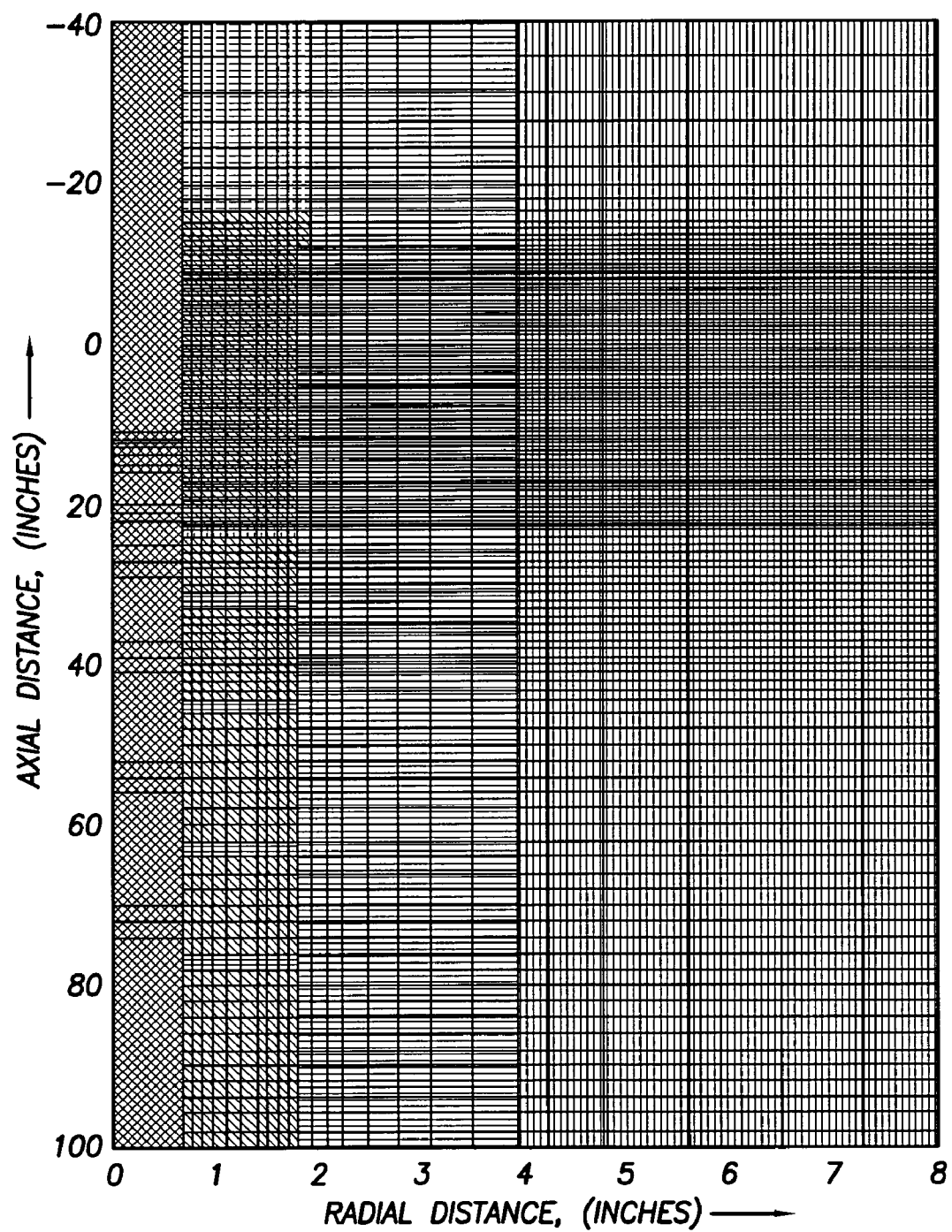
FIG. 19 shows a computer model of a prototype tool in accordance with another embodiment of the invention.
Figure 20:
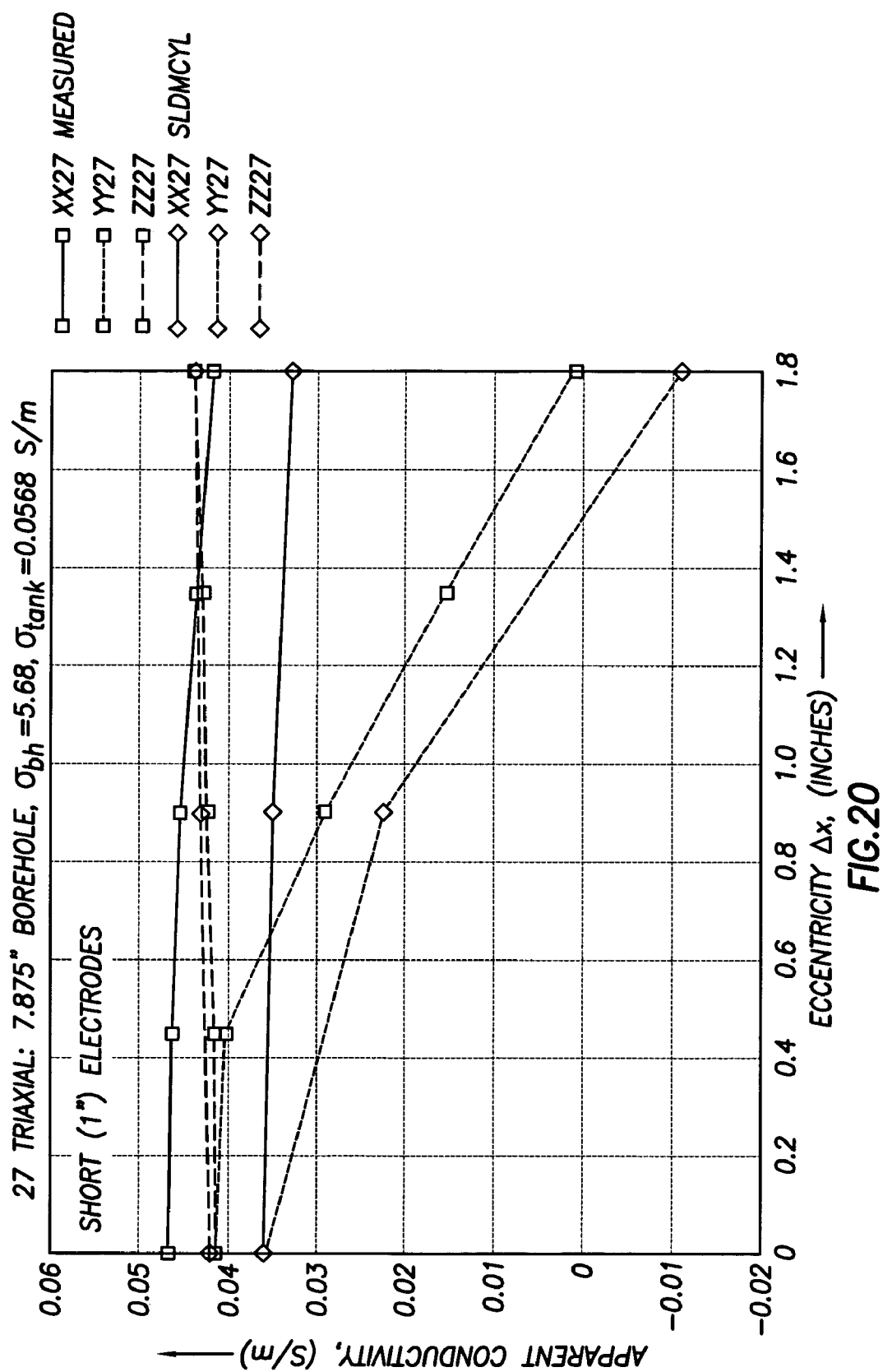
FIG. 20 shows 27" triaxial conductivity measurements in the presence of tool eccentering using a tool shown in FIG. 19, as compared with an insulating-body tool and a metal-body tool.

FIG. 19 shows a finite-difference model of a similar prototype with nine short electrodes. The electrode between the receiver coils at 15 and 21 inches was included in this prototype. The prototype was tested in a conductive pipe (TIVAR™ pipe) having a diameter approximately 7.9 inches and filled with salt water with a conductivity of 5.68 S/m. The tank conductivity was 56.8 mS/m in this case. The measured and calculated responses for the 27-inch spacing are shown in FIG. 20. In the 7.9-inch diameter tube, the geometry cannot be controlled as accurately as in the 13-inch tube, so the agreement in FIG. 20 is not as close as in FIG. 17.

Figure 21:
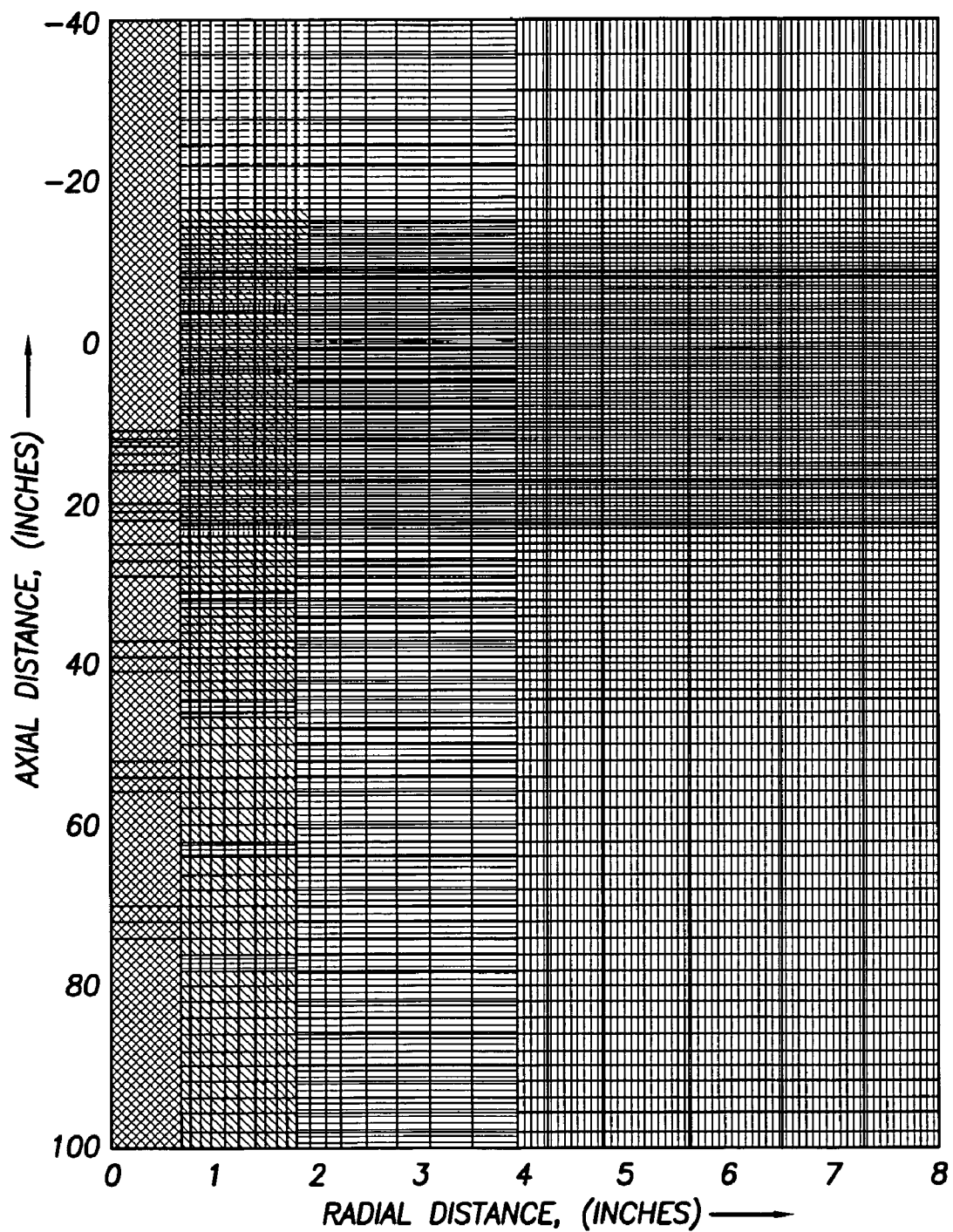
FIG. 21 shows a computer model of a prototype tool in accordance with another embodiment of the invention.
Figure 22:
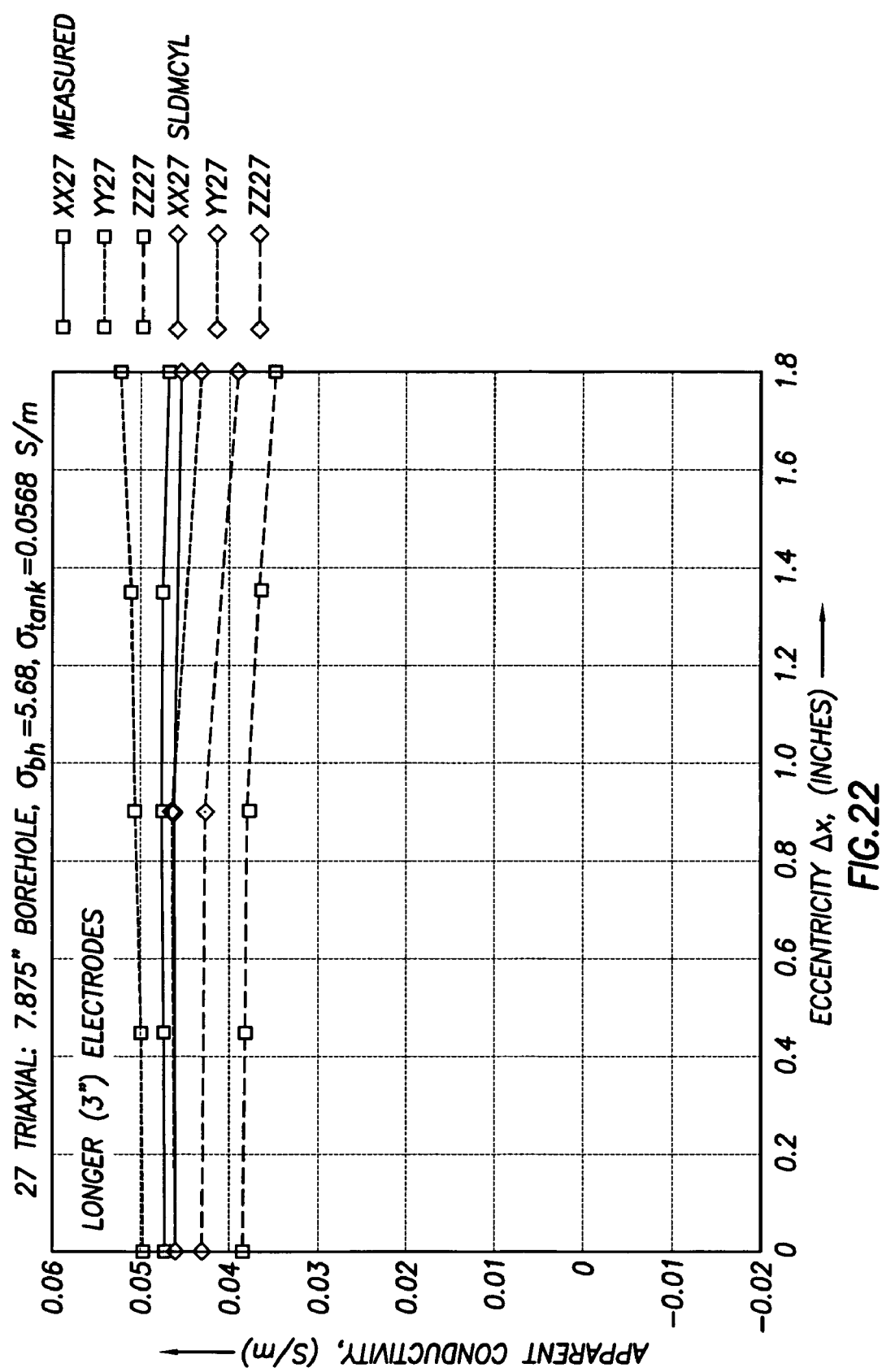
FIG. 22 shows 27" triaxial conductivity measurements in the presence of tool eccentering using a tool shown in FIG. 21, as compared with an insulating-body tool and a metal-body tool.

FIG. 21 shows responses from another variant with five one-inch electrodes and four three-inch fingered electrodes near the transmitter. Sufficiently close agreement between the calculated and experimental results is obtained for the 27" receivers (FIG. 22). This design gives 27XX and 27YY responses that are practically independent of eccentricity for this borehole diameter.

Figure 23:
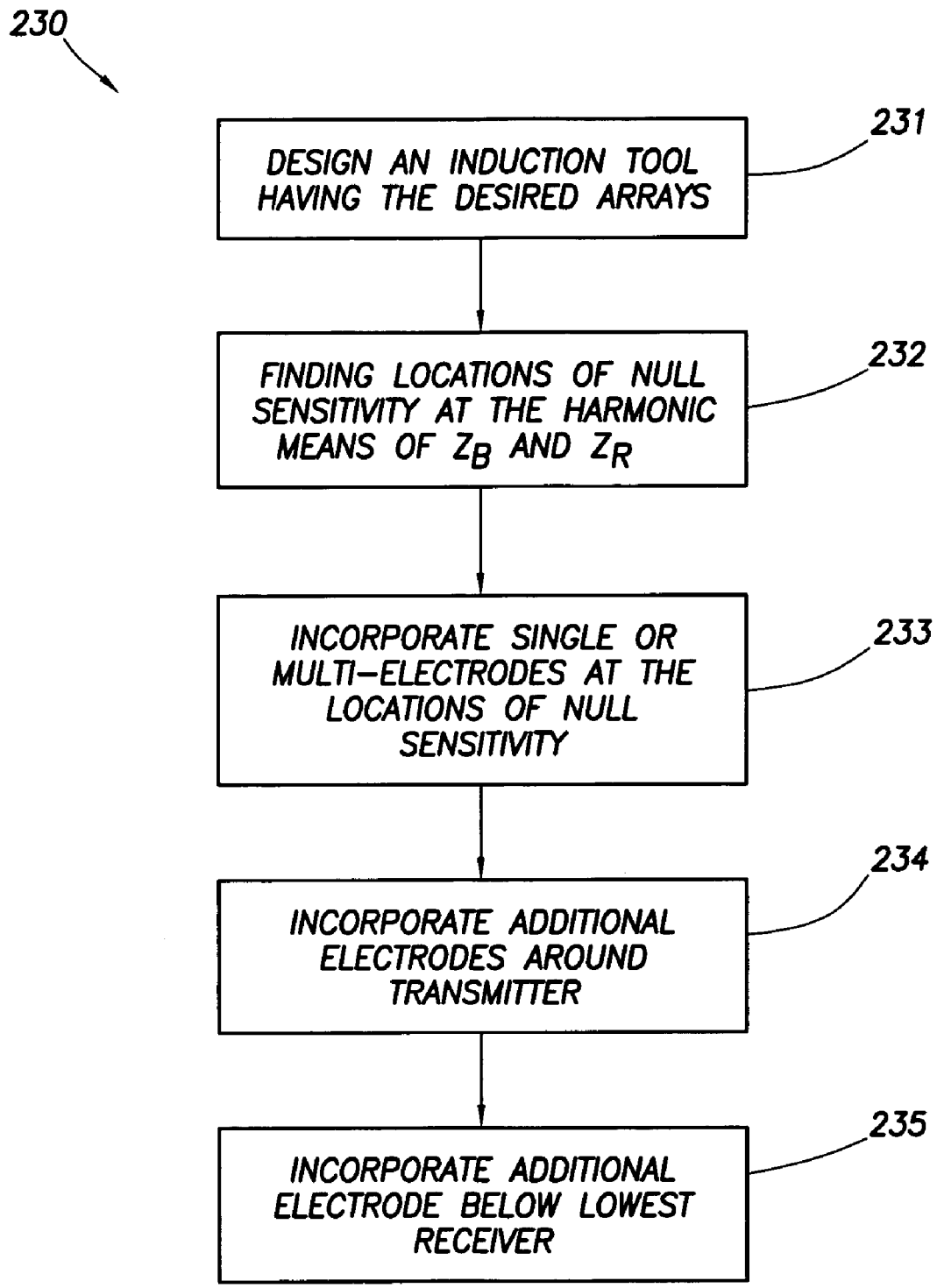
FIG. 23 shows a method for designing a tool that is less impacted by tool eccentering.

The above description clearly shows that induction tools can be designed to be more "resistant" to borehole effects. FIG. 23 summarizes a method for designing an induction tool in accordance with one embodiment of the invention. As shown, a method 230 may start with the design of a conventional induction tool (step 231). The convention induction tool may be a multi-array tool, such as the AIT™, which typically includes a common transmitter and a plurality of receivers and the corresponding bucking coils spaced apart from the transmitter. Some induction tools may include more than one transmitter and others may included electrodes for the measurements of shallow formation resistivity. Note that the tool may include arrays having longitudinal magnetic dipole coils, transverse magnetic dipole coils, tilted coils, or triaxial coils.

Based on the design of the induction tools, locations of null sensitivity ($z_0$) may be computed at the harmonic means of the spacing between transmitter and the bucking coil ($z_B$) and the spacing between the transmitter and the receiver ($z_R$) (step 232). Each location of null sensitivity is between a main receiver coil and the bucking coil connected to it in series.

Finally, one or more electrodes may be included on the induction tool at one or more locations proximate the locations of null sensitivity (step 233). In addition, an additional electrode (or multi-electrodes) may be included beyond the last receiver, preferably located a symmetrical location with respect to the last electrode (or multi-electrodes). Furthermore, as shown above, additional electrodes may be included around the transmitter (step 234), and below the lowest receiver (step 235), to further reduce borehole effects.

Note that preferred embodiments use multi-electrodes (such as the fingered electrodes); however, some embodiments may include single electrodes (such as a button electrode or a ring electrode having insulating gaps to disrupt azimuthal conductivity). Further note that the above description uses transverse arrays to illustrate the problems associated with borehole effects. It is clear that embodiments of the invention can effectively suppress/reduce the borehole effects in the transverse arrays. However, one of ordinary skill in the art would appreciate that embodiments of the invention may also be used with longitudinal arrays, tilted antenna arrays, or triaxial arrays. Embodiments of the invention are applicable to a wireline tool, a logging-while-drilling (LWD) tool, or a measurement-while-drilling (MWD) tool.

Advantages of embodiments of the invention include one or more of the following. Embodiments of the invention provide methods for canceling the large borehole effects that contaminate transverse or triaxial induction measurements. This cancellation technique is compatible with the mechanical construction of a wireline induction sonde, and has a minimal impact on the conventional coaxial induction measurements.

Embodiments of the invention provides an approximate formula for the position of null sensitivity where a small electrode (or a ring of multiple electrodes or fingered electrodes) may be placed between a main receiver coil and the bucking coil connected to it in series.

Properties of a tool in accordance with embodiments of the invention are similar to those of a metal-body tool with respect to (1) homogeneous medium response, (2) anisotropy response, (3) borehole eccentricity effects, and (4) separability of vertical response and borehole effects.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:
1. An induction tool, comprising:
    a conductive mandrel;
    at least one array comprising a transmitter, a bucking coil, and a receiver disposed in an insulating tool body surrounding the conductive mandrel; and
    an electrode disposed in the insulating tool body at a selected location between the bucking coil and the receiver, wherein the selected location is spaced from the transmitter at a distance corresponding approxi- mately to a harmonic mean of a distance between the transmitter and the bucking coil and a distance between the transmitter and the receiver, and wherein the electrode include a contact forming a conductive path to the conductive mandrel.

2. The induction tool of claim 1, wherein the at least one array comprises a transverse array or a triaxial array.

3. The induction tool of claim 1, wherein the electrode disposed between the bucking coil and the receiver comprises one selected from a ring electrode, a segmented ring electrode, a fingered electrode, and a plurality of button electrodes arranged around a circumference of the insulating tool body.

4. The induction tool of claim 1, wherein the harmonic mean is calculated according to:

$$z_0 = \frac{2}{\frac{1}{z_B} + \frac{1}{z_R}}$$

wherein $z_0$ is the distance corresponding to the harmonic mean, $z_B$, and $z_R$ are distances from the transmitter to the bucking coil and the receiver, respectively.

5. The induction tool of claim 1, further comprising an additional electrode disposed in the insulating tool body at a distance beyond a receiver having a longest spacing from the transmitter, wherein the additional electrode includes a conductor that contacts the conductive mandrel.

6. The induction tool of claim 1, further comprising a pair of electrodes disposed in the insulating tool body substantially symmetrical about the transmitter, wherein the pair of electrodes each include a conductor that contacts the conductive mandrel.

7. The induction tool of claim 6, further comprising an additional electrode disposed in the insulating tool body at a distance beyond a receiver having a longest spacing from the transmitter, wherein the additional electrode includes a conductor that contacts the conductive mandrel.

8. The induction tool of claim 6, further comprising a second pair of electrodes disposed in the insulating tool body substantially symmetrical about the transmitter, wherein the second pair of electrodes each include a conductor that contacts the conductive mandrel.

9. The induction tool of claim 8, further comprising an additional electrode disposed in the insulating tool body at a distance beyond a receiver having a longest spacing from the transmitter, wherein the additional electrode includes a conductor that contacts the conductive mandrel.

10. A method for designing an induction tool, comprising:
disposing at least one array comprising a transmitter, a bucking coil, and a receiver in an insulating tool body surrounding a conductive mandrel of the induction tool;
determining a location of null sensitivity, wherein the location of null sensitivity is located at a harmonic mean of a distance between the transmitter and the bucking coil and a distance between the transmitter and the receiver; and
disposing an electrode in the insulating tool body proximate the location of null sensitivity, wherein a conductive path is formed between the electrode and the conductive mandrel.

11. The method of claim 10, wherein the at least one array comprises a transverse array or a triaxial array.

12. The method of claim 10, wherein the electrode comprises one selected from a ring electrode, a segmented ring electrode, a fingered electrode, and a plurality of button electrodes arranged around a circumference of the insulating tool body.

13. The induction tool of claim 10, wherein the harmonic mean is calculated according to:

$$z_0 = \frac{2}{\frac{1}{z_B} + \frac{1}{z_R}}$$

wherein $z_0$ is the distance corresponding to the harmonic mean, $z_B$, and $z_R$ are distances from the transmitter to the bucking coil and the receiver, respectively.

14. The method of claim 10, further comprising disposing an additional electrode in the insulating tool body at a distance beyond a receiver having a longest spacing from the transmitter, wherein the additional electrode includes a conductor that contacts the conductive mandrel.

15. The method of claim 10, further comprising disposing a pair of electrodes in the insulating tool body substantially symmetrical about the transmitter, wherein the pair of electrodes each include a conductor that contacts the conductive mandrel.

16. The method of claim 15, further comprising disposing an additional electrode in the insulating tool body at a distance beyond a receiver having a longest spacing from the transmitter, wherein the additional electrode includes a conductor that contacts the conductive mandrel.

17. The method of claim 15, further comprising disposing a second pair of electrodes in the insulating tool body substantially symmetrical about the transmitter, wherein the second pair of electrodes each include a conductor that contacts the conductive mandrel.

18. The method of claim 17, further comprising disposing an additional electrode in the insulating tool body at a distance beyond a receiver having a longest spacing from the transmitter, wherein the additional electrode includes a conductor that contacts the conductive mandrel.

* * * * *